United States Patent
Nomura

(10) Patent No.: US 7,574,121 B2
(45) Date of Patent: Aug. 11, 2009

(54) IMAGING DEVICE HAVING AN OPTICAL IMAGE STABILIZER

(75) Inventor: Hiroshi Nomura, Saitama (JP)

(73) Assignee: Hoya Corporation, Tokyo (JP)

( * ) Notice: Subject to any disclaimer, the term of this patent is extended or adjusted under 35 U.S.C. 154(b) by 384 days.

(21) Appl. No.: 11/289,739

(22) Filed: Nov. 30, 2005

(65) Prior Publication Data

US 2006/0115258 A1 Jun. 1, 2006

(30) Foreign Application Priority Data

Dec. 1, 2004 (JP) ............................. 2004-349184
Mar. 1, 2005 (JP) ............................. 2005-056292

(51) Int. Cl.
*G03B 17/00* (2006.01)
(52) U.S. Cl. .................................. 396/55; 348/208.99
(58) Field of Classification Search .................. 396/55, 396/73–75, 270, 349–350, 52; 348/208.4–208.7, 348/208.11, 208.13, 340, 208.99; 359/554
See application file for complete search history.

(56) References Cited

U.S. PATENT DOCUMENTS

| 3,701,307 | A | * | 10/1972 | Clos et al. ................... 396/270 |
| 4,768,048 | A | | 8/1988 | Wakabayashi |
| 5,430,516 | A | | 7/1995 | Uziie et al. |
| 5,739,962 | A | | 4/1998 | Asakura et al. |
| 6,031,998 | A | * | 2/2000 | Shono .......................... 396/75 |
| 6,366,323 | B1 | | 4/2002 | Shono |
| 6,978,089 | B2 | | 12/2005 | Nomura et al. |
| 2003/0067544 | A1 | * | 4/2003 | Wada ....................... 348/208.7 |
| 2003/0156832 | A1 | | 8/2003 | Nomura et al. |
| 2005/0052570 | A1 | | 3/2005 | Enomoto |
| 2005/0168584 | A1 | * | 8/2005 | Uenaka ................. 348/208.99 |
| 2006/0083503 | A1 | * | 4/2006 | Fukai ......................... 396/55 |

FOREIGN PATENT DOCUMENTS

| GB | 2236453 | 4/1991 |
| JP | 6-46314 | 2/1994 |
| JP | 2003-110928 | 4/2003 |

(Continued)

OTHER PUBLICATIONS

U.S. Appl. No. 11/289,556 to Nomura, which was file on Nov. 30, 2005.

(Continued)

*Primary Examiner*—Bot LeDynh
(74) *Attorney, Agent, or Firm*—Greenblum & Bernstein, P.L.C.

(57) ABSTRACT

An imaging device includes an imaging sensor having an imaging surface upon which an object image is formed via a photographing optical system; a guiding device for guiding the imaging sensor in a direction parallel to the imaging surface of the imaging sensor; and a driving device for driving the imaging sensor, while being guided by the guiding device, based on an output of an image-shake detector which detects a direction and magnitude of an amount of vibration applied to the photographing optical system. One and the other of the guiding device and the driving device are respectively provided in front of and behind an image-stabilizing plane, which is coincident with the imaging surface of the imaging sensor, with respect to an optical axis direction of the photographing optical system.

12 Claims, 26 Drawing Sheets

FOREIGN PATENT DOCUMENTS

| | | |
|---|---|---|
| JP | 2003-111449 | 4/2003 |
| JP | 2004-48266 | 2/2004 |

OTHER PUBLICATIONS

U.S. Appl. No. 11/289,557 to Nomura, which was file on Nov. 30, 2005.
U.S. Appl. No. 11/289,478 to Nomura, which was file on Nov. 30, 2005.
U.S. Appl. No. 11/289,594 to Nomura, which was file on Nov. 30, 2005.
U.S. Appl. No. 11/289,560 to Nomura, which was file on Nov. 30, 2005.
U.S. Appl. No. 11/289,600 to Nomura, which was file on Nov. 30, 2005.
U.S. Appl. No. 11/289,602 to Nomura, which was file on Nov. 30, 2005.
U.S. Appl. No. 11/289,481 to Nomura, which was file on Nov. 30, 2005.
U.S. Appl. No. 11/289,558 to Nomura, which was file on Nov. 30, 2005.
U.S. Appl. No. 11/289,601 to Nomura, which was file on Nov. 30, 2005.
English Lanuage Abstract of JP 6-46314, Feb. 18, 1994.
English Language Abstract of JP 2003-110928, Apr. 11, 2003.
English Language Abstract of JP 2003-111449, Apr. 11, 2003.
English Language Abstract of JP 2004-48266, Feb. 12, 2004.

* cited by examiner

006
IMAGING DEVICE HAVING AN OPTICAL IMAGE STABILIZER

This application claims foreign priority under 35 U.S.C. 119(a-d) based on Japanese Patent applications No. 2004-349184, filed Dec. 1, 2004, and No. 2005-56292, filed Mar. 1, 2005, the contents of which are incorporated herein by reference in their entirety.

BACKGROUND OF THE INVENTION

1. Field of the Invention

The present invention relates to an imaging device, and more specifically, relates to an imaging device having an optical image stabilizer which performs an image-stabilizing operation by driving an imaging sensor (CCD) so as to counteract image shake due to vibrations such as hand shake (camera shake).

2. Description of the Related Art

In image devices such as cameras which have image stabilizers for correcting camera shake (image shake), when vibrations such as hand shake are applied to the camera body, are well known in the art. For example, in a digital camera which uses an imaging sensor such as a CCD or CMOS as an imaging medium, image-stabilization is carried out by moving the imaging sensor along a plane (in a direction parallel to the imaging surface of the imaging sensor) which lies orthogonal to the incident optical axis of the imaging sensor in accordance with angular velocity data of the detected camera shake.

Since the positional error due to tilting, caused by camera shake, etc., of the imaging sensor has a large adverse influence on the picture quality, when the imaging sensor is driven in order to correct image-shake, a significantly high driving precision is required. Primary causes of adverse influence on the driving precision are clearance, which exists in the guide shaft portions for guiding the imaging sensor, and backlash which occurs within the driving-force transmission mechanism for transferring driving force from a driving device such as a motor.

SUMMARY OF THE INVENTION

The present invention provides a compact imaging device having an optical image stabilizer which can carry out image-stabilization by driving an imaging sensor with high precision, and can be provided at low cost.

According to aspect of the present invention, an imaging device is provided, including an imaging sensor having an imaging surface upon which an object image is formed via a photographing optical system; a guiding device for guiding the imaging sensor in a direction parallel to the imaging surface of the imaging sensor; and a driving device for driving the imaging sensor, while being guided by the guiding device, based on an output of an image-shake detector which detects a direction and magnitude of an amount of vibration applied to the photographing optical system. One and the other of the guiding device and the driving device are respectively provided in front of and behind an image-stabilizing plane, which is coincident with the imaging surface of the imaging sensor, with respect to an optical axis direction of the photographing optical system.

It is desirable for the driving device to be provided in front of the image-stabilizing plane, and the guiding device to be provided behind the image-stabilizing plane, which respect to the optical axis direction.

It is desirable for the guiding device and the driving device to be a first guiding device and a first driving device for linearly moving the imaging sensor along the image-stabilizing plane in a first direction, and a second guiding device and a second driving device for linearly moving the imaging sensor along the image-stabilizing plane in a second direction.

It is desirable for the guiding device to be provided so as to extend in a direction parallel to the image-stabilizing plane, wherein the guiding device includes a linear guide shaft which is slidably fitted through an imaging-sensor supporting member.

It is desirable for the driving device to include a motor having a rotational shaft which extends substantially parallel to the linear guide shaft, and a driving-force transmission device which converts a rotational motion of the rotational shaft of the motor into linear motion which moves in a direction parallel to the linear guide shaft, so as to apply the linear motion to the imaging-sensor supporting member.

It is desirable for the motor to include a stepping motor.

It is desirable for the driving-force transmission device to include a driven nut which is moved in the direction parallel to the linear guide shaft in accordance with rotation of the rotational shaft of the motor.

It is desirable for the driving-force transmission device to include a linearly moving member which is moved in the direction parallel to the linear guide shaft via the driven nut; and a swing member which is rotatable about a rotation axis parallel to the optical axis of the photographing optical system, the swing member pushing the imaging-sensor supporting member, which supports the image sensor, to move along the guiding direction of the linear guide shaft.

According to the above-described structure, a compact imaging device having an optical image stabilizer which can carry out image-stabilization by driving an imaging sensor with high precision, and can be provided at low cost.

The present disclosure relates to subject matter contained in Japanese Patent Application No. 2004-349184 (filed on Dec. 1, 2004), and Japanese Patent Application No. 2005-56292 (filed on Mar. 1, 2005), which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

Figure 1:
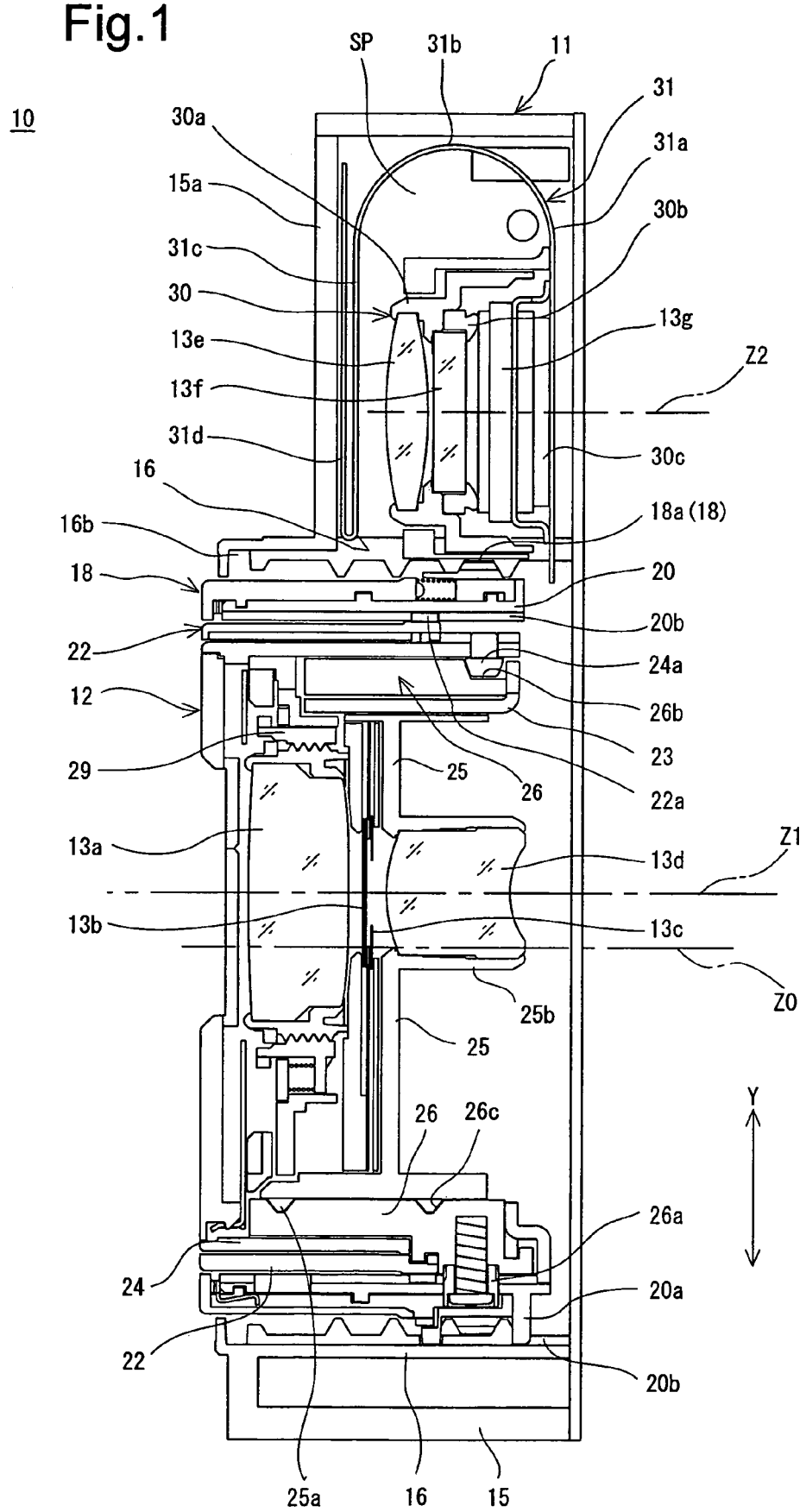
FIG. 1 is a cross-sectional view of an embodiment of a retractable zoom lens to which the present invention is applied in the retracted state of the zoom lens barrel.
Figure 2:
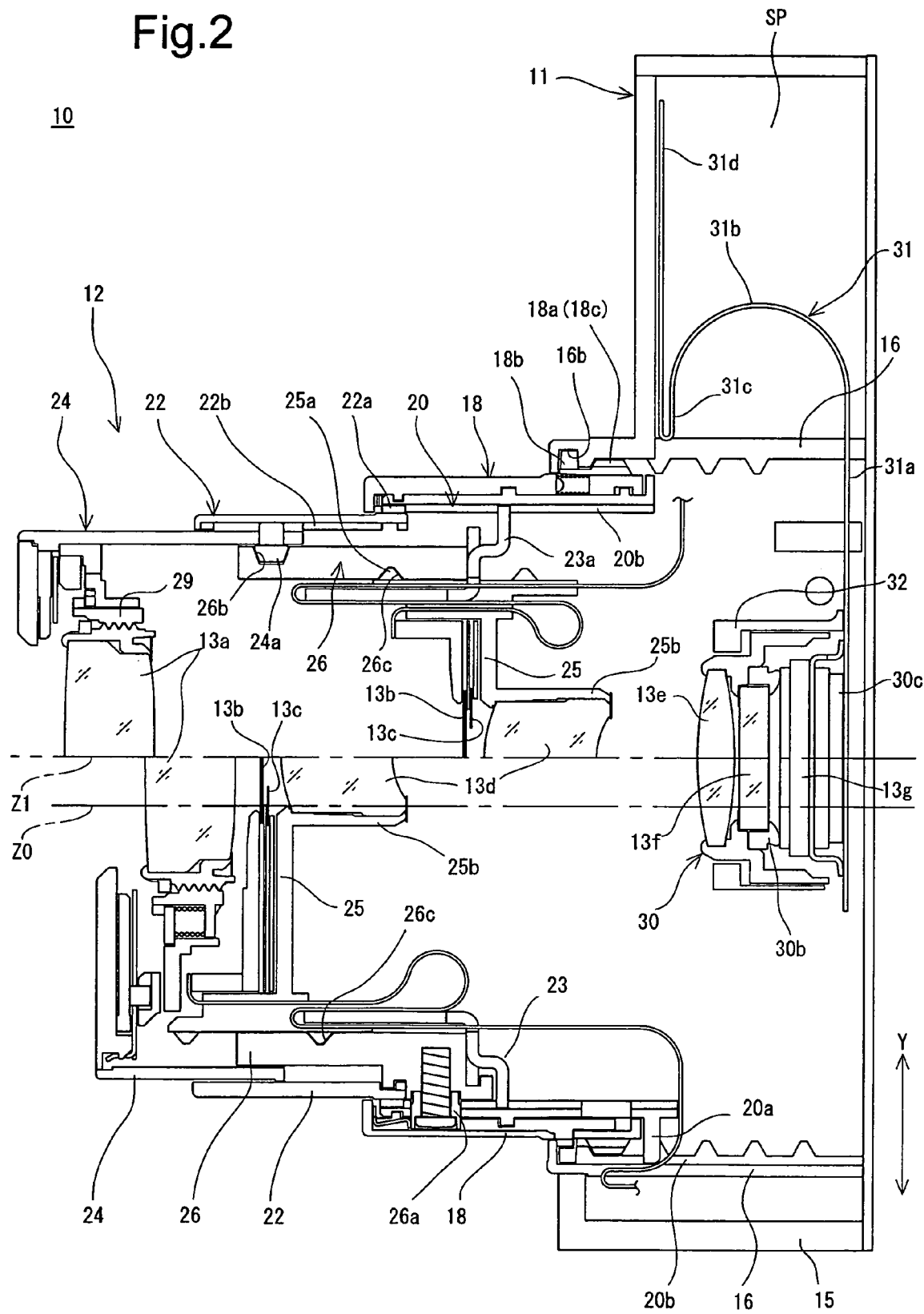
FIG. 2 is a cross-sectional view of the zoom lens shown in FIG. 1 in a photographic state of the zoom lens.
Figure 5:
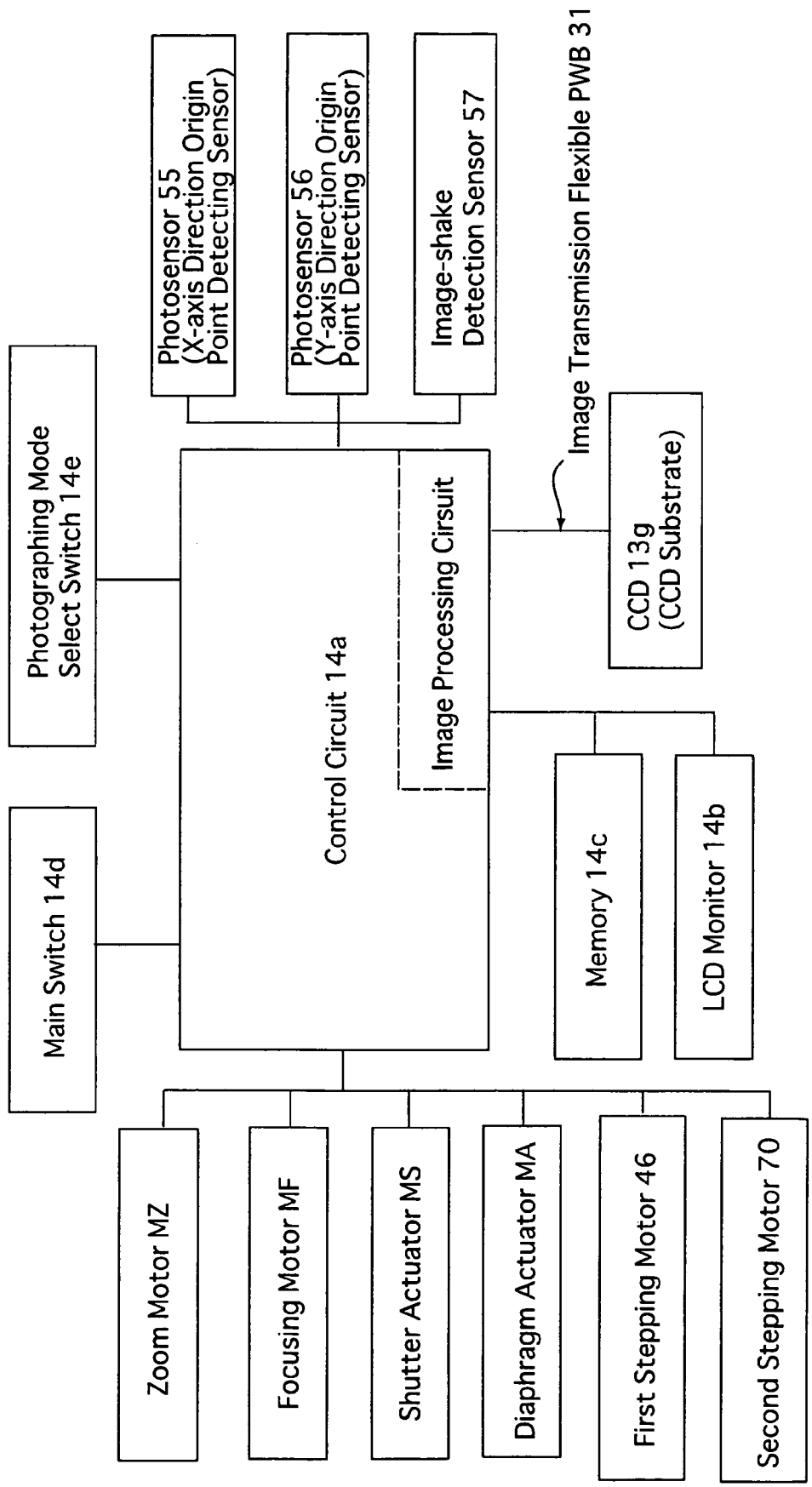
FIG. 5 is a block diagram illustrating a configuration of electrical circuits of a camera equipped with the zoom lens shown in FIGS. 1 and 2.

FIGS. 1 and 2 show cross-sections of a zoom lens 10 which is incorporated in a zoom lens camera. The zoom lens 10 is provided with a box-shaped housing 11 and a retractable barrel portion 12 retractably supported inside the housing 11. The outside of the housing 11 is covered by exterior components of the camera; the exterior components are not shown in the drawings. A photographing optical system of the zoom lens 10 includes a first lens group 13a, a shutter 13b, a diaphragm 13c, a second lens group 13d, a third lens group 13e, a low-pass filter 13f, and a CCD image sensor 13g (hereinafter referred to as a CCD), in that order from the object side (the left side as viewed in FIGS. 1 and 2). As shown in FIG. 5, the CCD 13g is electrically connected to a control circuit 14a having an image processing circuit. Thus, an electronic image can be displayed on an LCD monitor 14b provided on an outer surface of the camera, and the electronic image data can be recorded in a memory 14c. In a photographic state (ready-to-photograph state) of the zoom lens 10 shown in FIG. 2, all of the optical elements constituting the photographing optical system are aligned on the same photographing optical axis Z1. On the other hand, in an accommodated (radially retracted) state of the zoom lens 10 shown in FIG. 1, the third lens group 13e, the low-pass filter 13f and the CCD 13g are moved away from the photographing optical axis Z1 to be radially retracted upward in the housing 11, and the second lens group 13d is linearly retracted into the space created as a result of the upward radial retracting movement of the third lens group 13e, the low-pass filter 13f and the CCD 13g, which reduces the length of the zoom lens 10 in the retracted state thereof. The overall structure of the zoom lens 10 that includes a radially-retracting mechanism for radially retracting optical elements upward will be described hereinafter. In the following description, the vertical direction and the horizontal direction of the zoom lens camera body equipped with the zoom lens 10 as viewed from the front thereof are defined as a y-axis and an x-axis, respectively.

The housing 11 is provided with a hollow box-shaped portion 15 and a hollow fixed ring portion 16 which is formed on a front wall 15a of the box-shaped portion 15 so as to enclose the photographing optical system about the photographing optical axis Z1. A rotation center axis Z0 serving as the center of the fixed ring portion 16 is parallel to the photographing optical axis Z1 and eccentrically located below the photographing optical axis Z1. A retraction space (accommodation space) SP (FIGS. 1 and 2) is formed inside the box-shaped portion 15 and above the fixed ring portion 16.

Figure 8:
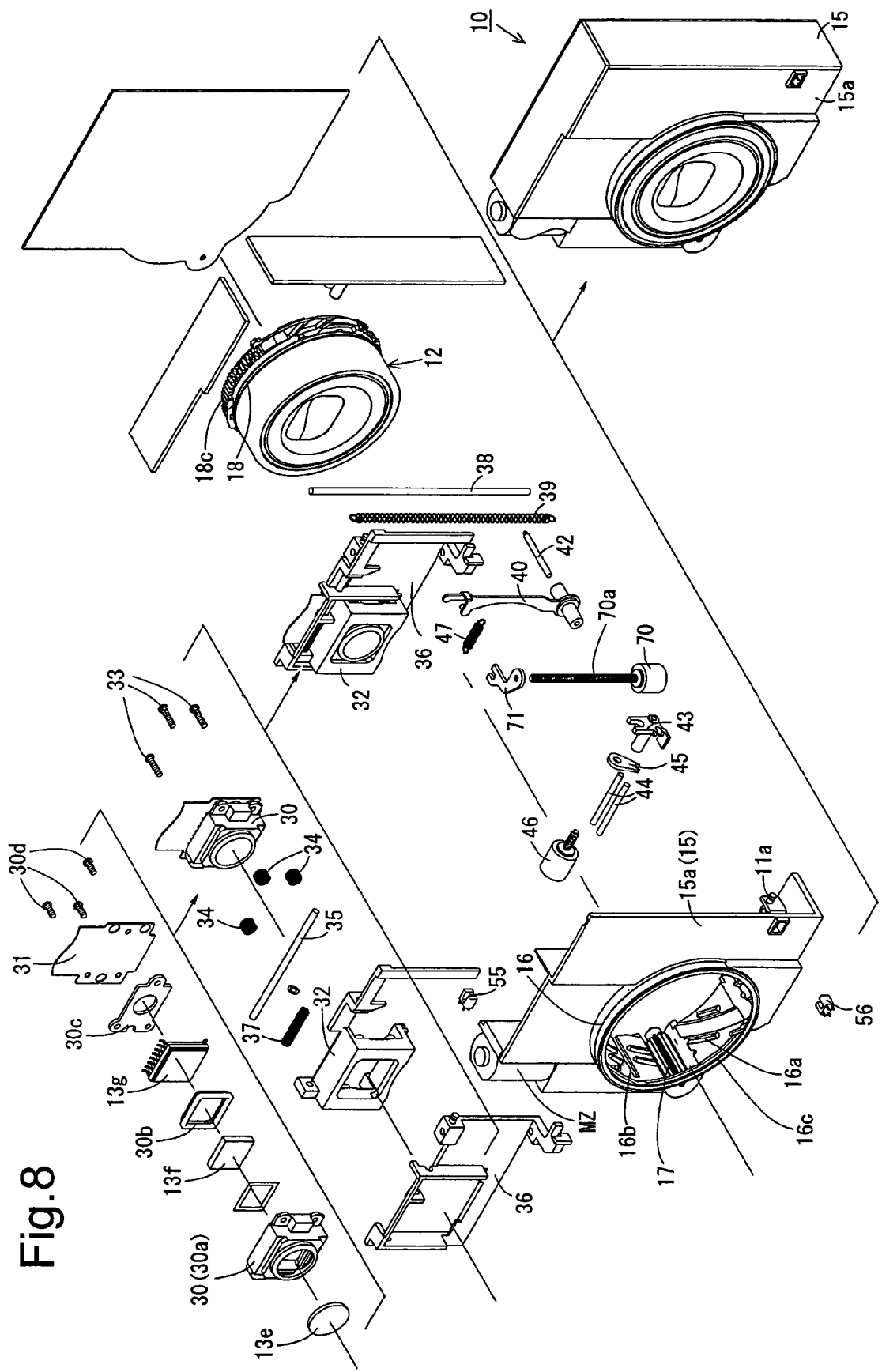
FIG. 8 is an exploded perspective view of the zoom lens shown in FIGS. 1 and 2.

A zoom gear 17 (FIGS. 8, 10 and 11) is supported on an inner peripheral surface side of the fixed ring portion 16 to be rotatable on an axis of rotation parallel to the rotation center axis Z0. The zoom gear 17 is rotated forward and reverse by a zoom motor MZ (FIGS. 5, 10, and 11) supported by the housing 11. In addition, the fixed ring portion 16 is provided on an inner peripheral surface thereof with a female helicoid 16a, a circumferential groove 16b and a plurality of linear guide grooves 16c (only one of them is shown in FIG. 8). The circumferential groove 16b is an annular groove with its center on the rotation center axis Z0, while the plurality of the linear guide grooves 16c are parallel to the rotation center axis Z0 (see FIGS. 3, 4 and 8).

Figure 10:
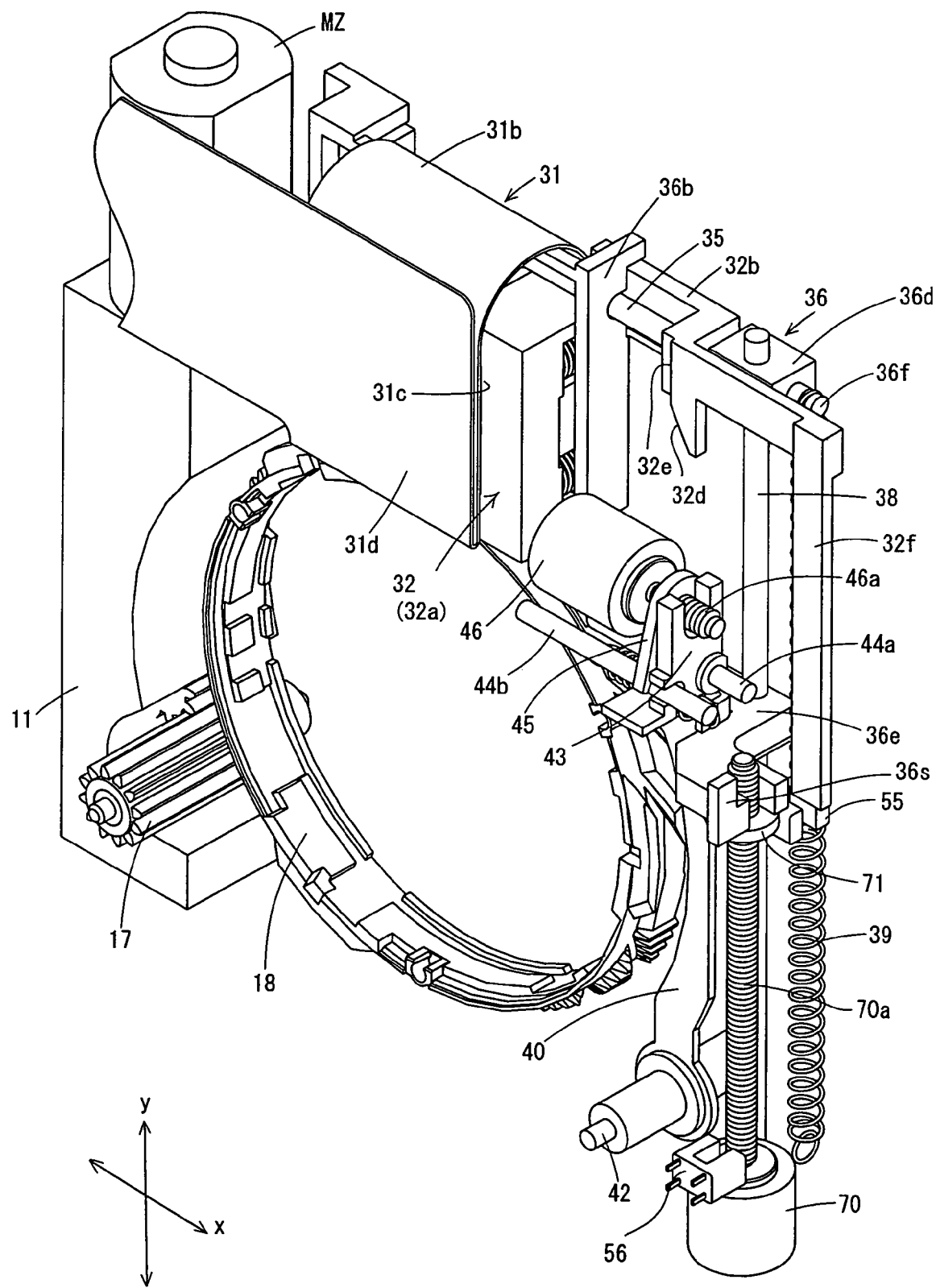
FIG. 10 is a front perspective view of the image stabilizing mechanism and the radially-retracting mechanism, illustrating the retracted state of a CCD holder in the retracted state of the zoom lens shown in FIG. 1.
Figure 11:
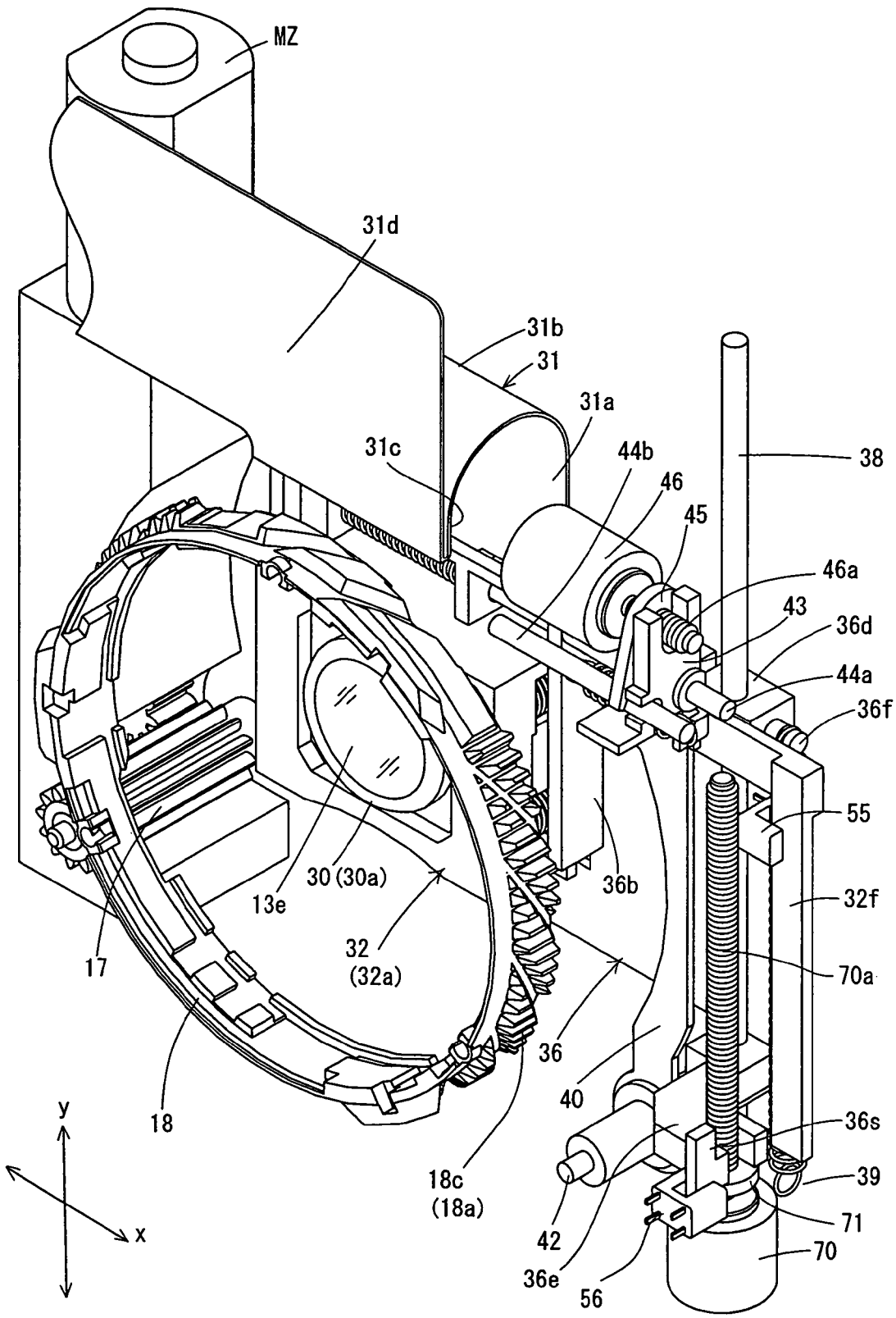
FIG. 11 is a front perspective view of the image stabilizing mechanism and the radially-retracting mechanism, illustrating the optical-axis advanced state of the CCD holder in a photographic state of the zoom lens.

A helicoid ring 18 is supported inside the fixed ring portion 16 to be rotatable about the rotation center axis Z0. The helicoid ring 18 is provided with a male helicoid 18a which is engaged with the female helicoid 16a of the fixed ring portion 16 and thus can advance and retract in the optical axis direction while rotating due to the engagement of the female helicoid 16a with the male helicoid 18a. The helicoid ring 18 is further provided, on an outer peripheral surface thereof in front of the female helicoid 18a, with a plurality of rotation guiding protrusions 18b (only two of them are shown in FIG. 8). In a state shown in FIGS. 2 through 4 in which the helicoid ring 18 advances to the frontmost position thereof with respect to the fixed ring portion 16, the female helicoid 16a and the male helicoid 18a are disengaged from each other while the plurality of rotation guiding protrusions 18b are slidably fitted in the circumferential groove 16b so that the helicoid ring 18 is prevented from further moving in the optical axis direction and is allowed only to rotate at a fixed position in the optical axis direction. The helicoid ring 18 is further provided on threads of the male helicoid 18a with an annular spur gear 18c which is in mesh with the zoom gear 17. Teeth of the spur gear 18c are aligned parallel to the photographing optical axis Z1. The zoom gear 17 is elongated in the axial direction thereof so as to remain engaged with the spur gear 18c at all times over the entire range of movement of the helicoid ring 18 from a retracted state of the helicoid ring 18 shown in FIGS. 1 and 10 to an extended state of the helicoid ring 18 shown in FIGS. 2 and 11. The helicoid ring 18 is constructed by combining two ring members which are splittable in the optical axis direction. In FIGS. 10 and 11, only the rear ring member of the helicoid ring 18 is shown.

Figure 3:
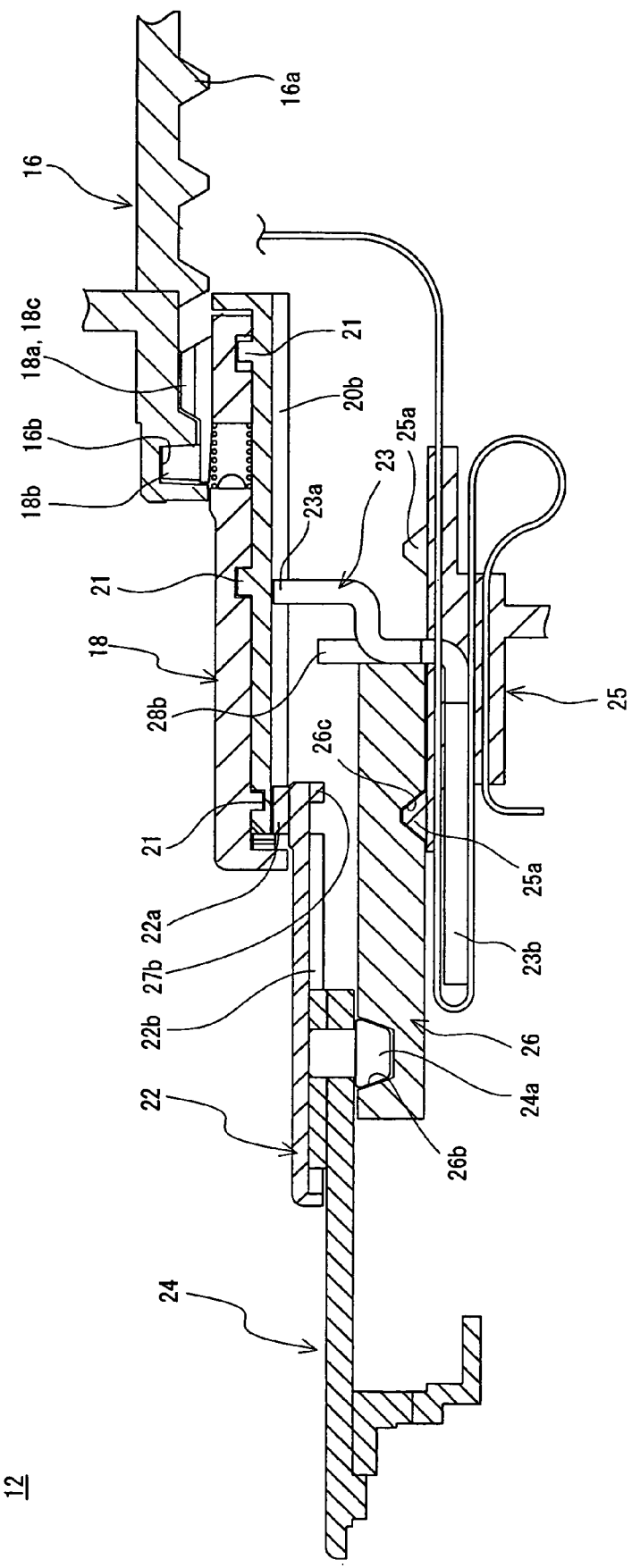
FIG. 3 is an enlarged cross-sectional view of a part of the zoom lens at the wide-angle extremity thereof.
Figure 4:
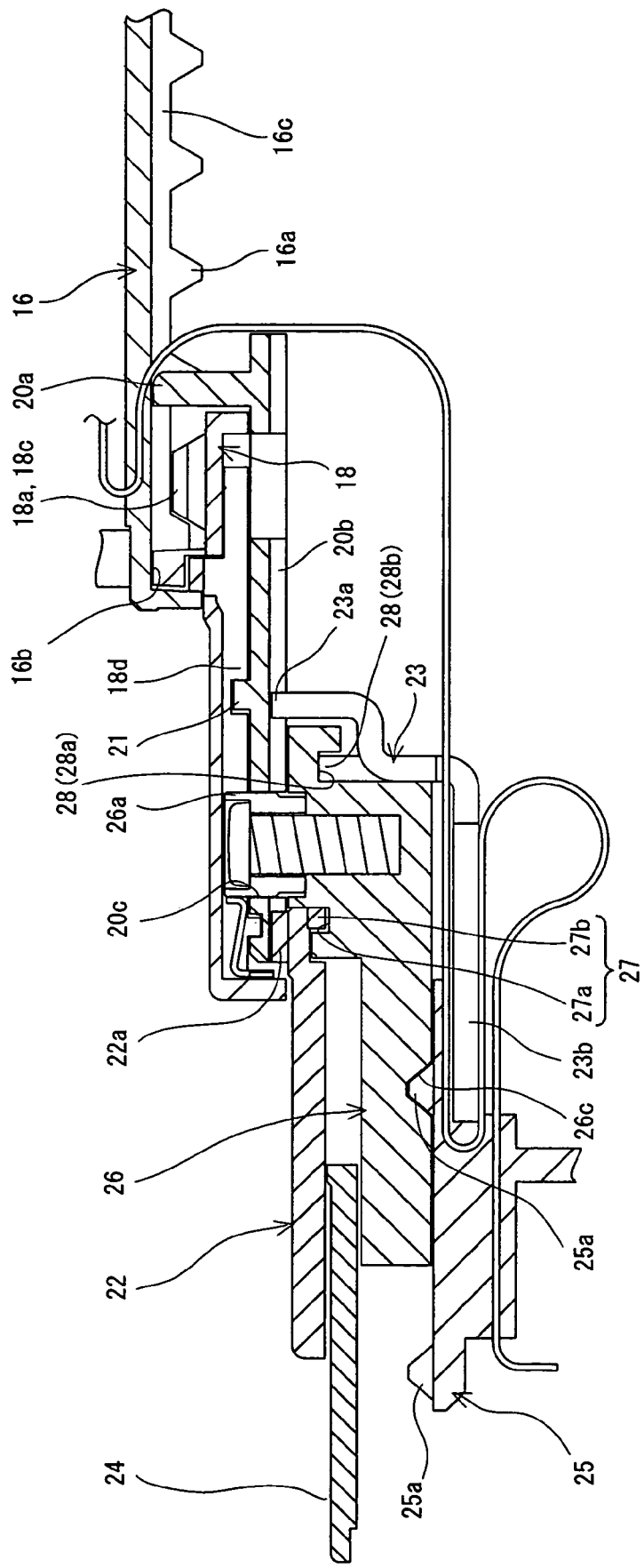
FIG. 4 is an enlarged cross-sectional view of a part of the zoom lens at the telephoto extremity thereof.

A linear guide ring 20 is supported inside the helicoid ring 18. The linear guide ring 20 is provided in the vicinity of the rear end thereof with a linear guide projection 20a, and is guided linearly along the rotation center axis Z0 (and the photographing optical axis Z1) by the slidable engagement of the linear guide projection 20a with the linear guide groove 16c of the fixed ring portion 16 as shown in FIG. 4. A rotation guiding portion 21 is provided between the inner peripheral surface of the helicoid ring 18 and the outer peripheral surface of the linear guide ring 20. The helicoid ring 18 is supported by the linear guide ring 20 to be rotatable with respect to the linear guide ring 20 and to be movable together with the linear guide ring 20 in the optical axis direction via the rotation guiding portion 21. The rotation guiding portion 21 consists of a plurality of circumferential grooves provided at different positions in the axial direction and radial protrusions, each of which is slidably engaged in the corresponding circumferential groove (see FIGS. 3 and 4).

The linear guide ring 20 is provided on an inner peripheral surface thereof with a plurality of linear guide grooves 20b (only one of them is shown in each of FIGS. 1 through 4) which extend parallel to the rotation center axis Z0 (and the photographing optical axis Z1). A plurality of linear guide projections 22a (only one of them is shown in each of FIGS. 1 through 4) which project radially outwards from a first lens group linear guide ring 22 and a plurality of linear guide projections 23a (only one of them is shown in each of FIGS. 1 through 4) which project radially outwards from a second lens group linear guide ring 23 are slidably engaged with the plurality of linear guide grooves 20b, respectively. The first lens group linear guide ring 22 guides a first lens group support frame 24 linearly in a direction parallel to the rotation center axis Z0 (and the photographing optical axis Z1) via a plurality of linear guide grooves 22b (only one of them is shown in each of FIGS. 2 and 3) formed on an inner peripheral surface of the first lens group linear guide ring 22. The second lens group linear guide ring 23 guides a second lens group support frame 25 linearly in a direction parallel to the rotation center axis Z0 (and the photographing optical axis Z1) via a plurality of linear guide keys 23b (only one of them is shown in each of FIGS. 1 through 4). The first lens group support frame 24 supports the first lens group 13a via a focusing frame 29, and the second lens group support frame 25 supports the second lens group 13d.

A cam ring 26 is provided inside the linear guide ring 20 to be rotatable about the rotation center axis Z0. The cam ring 26 is supported by the first lens group linear guide ring 22 and the second lens group linear guide ring 23 to be rotatable with respect to each of the first lens group linear guide ring 22 and the second lens group linear guide ring 23 and to movable in the optical axis direction together therewith via rotation guiding portions 27 and 28 (see FIG. 4). As shown in FIGS. 3 and 4, the rotation guiding portion 27 is composed of a discontinuous circumferential groove 27a (not shown in FIG. 3) which is formed on an outer peripheral surface of the cam ring 26, and an inner flange 27b which projects radially inwards from the first lens group linear guide ring 22 to be slidably engaged in the discontinuous circumferential groove 27a. As shown in FIGS. 3 and 4, the rotation guiding portion 28 is composed of a discontinuous circumferential groove 28a (not shown in FIG. 3) formed on an inner peripheral surface of the cam ring 26 and an outer flange 28b which projects radially outwards from the second lens group linear guide ring 23 to be slidably engaged in the discontinuous circumferential groove 28a.

As shown in FIG. 4, the cam ring 26 is provided thereon with a plurality of follower protrusions 26a (only one of them is shown in FIG. 4) which project radially outwards. The plurality of follower protrusions 26a passes through a plurality of follower guide slots 20c (only one of them is shown in FIG. 4) formed in the linear guide ring 20 to be engaged in a plurality of rotation transfer grooves 18d (only one of them is shown in FIG. 4) formed on an inner peripheral surface of the helicoid ring 18. Each rotation transfer groove 18d is parallel to the rotation center axis Z0 (and the photographing optical axis Z1), and each follower protrusion 26a is slidably engaged in the associated rotation transfer groove 18d to be prevented from moving in the circumferential direction relative to the associated rotation transfer groove 18d. Accordingly, the rotation of the helicoid ring 18 is transferred to the cam ring 26 via the engagement between the plurality of rotation transfer grooves 18d and the plurality of follower protrusions 26a. Although the development shape of each follower guide groove 20c is not shown in the drawings, each follower guide groove 20c is a guide groove including a circumferential groove portion with its center on the rotation center axis Z0 and an inclined lead groove portion parallel to the female helicoid 16a. Accordingly, when rotated by a rotation of the helicoid ring 18, the cam ring 26 rotates while moving forward or rearward along the rotation center axis Z0 (and the photographing optical axis Z1) if each follower protrusion 26a is engaged in the lead groove portion of the associated follower guide groove 20c, and rotates at a fixed position in the optical axis direction without moving forward or rearward if each follower protrusion 26a is engaged in the circumferential groove portion of the associated follower guide groove 20c.

The cam ring 26 is a double-sided cam ring having a plurality of outer cam grooves 26b (only one of them is shown in FIG. 3) and a plurality of inner cam grooves 26c (only one of them is shown in each of FIGS. 3 and 4) on outer and inner peripheral surfaces of the cam ring 26, respectively. The plurality of outer cam grooves 26b are slidably engaged with a plurality of cam followers 24a (only one of them is shown in FIG. 3) which project radially inwards from the first lens group support frame 24, respectively, while the plurality of inner cam grooves 26c are slidably engaged with a plurality of cam followers 25a (only one of them is shown in each of FIGS. 3 and 4) which project radially outwards from the second lens group support frame 25. Accordingly, when the cam ring 26 is rotated, the first lens group support frame 24 that is guided linearly in the optical axis direction by the first lens group linear guide ring 22 moves forward and rearward along the rotation center axis Z0 (and the photographing optical axis Z1) in predetermined motion in accordance with contours of the plurality of outer cam grooves 26b. likewise, when the cam ring 26 is rotated, the second lens group support frame 25 that is guided linearly in the optical axis direction by the second lens group linear guide ring 23 moves forward and rearward along the rotation center axis Z0 (and the photographing optical axis Z1) in predetermined motion in accordance with contours of the plurality of the plurality of inner cam grooves 26c.

The second lens group support frame 25 is provided with a cylindrical portion 25b (see FIGS. 1 and 2) which holds the second lens group 13d, and supports the shutter 13b and the diaphragm 13c in front of the cylindrical portion 25b to allow each of the shutter 13b and the diaphragm 13c to be opened and closed. The shutter 13b and the diaphragm 13c can be opened and closed by a shutter actuator MS and a diaphragm actuator MA (see FIG. 5), respectively, which are supported by the second lens group support frame 25.

The focusing frame 29 which holds the first lens group 13a is supported by the first lens group support frame 24 to be movable along the rotation center axis Z0 (and the photographing optical axis Z1). The focusing frame 29 can be moved forward and rearward by a focusing motor MF (see FIG. 5).

The operation of each of the zoom motor MZ, the shutter actuator MS, the diaphragm actuator MA and the focusing motor MF is controlled by the control circuit 14a. Upon turning on a main switch 14d (see FIG. 5) of the camera, the zoom motor MZ is driven to bring the zoom lens 10 to the photographic state shown in FIG. 2. Upon turning off the main switch 14d, the zoom lens 10 is moved from the photographic state to the retracted state shown in FIG. 1.

The above described operation of the zoom lens 10 is summarized as follows. Upon turning on the main switch 14d in the retracted state of the zoom lens 10 shown in FIG. 1, the zoom gear 17 is driven to rotate in a lens barrel advancing direction. Accordingly, the helicoid ring 18 moves forward in the optical axis direction while rotating, and simultaneously, the linear guide ring 20 linearly moves forward in the optical axis direction together with the helicoid ring 18. In addition, the rotation of the helicoid ring 18 causes the cam ring 26 to move forward in the optical axis direction while rotating relative to the linear guide ring 20. The first lens group linear guide ring 22 and the second lens group linear guide ring 23 linearly move forward in the optical axis direction together with the cam ring 26. Each of the first lens group support frame 24 and the second lens group support frame 25 moves in the optical axis direction relative to the cam ring 26 in predetermined motion. Therefore, the moving amount of the first lens group 13a in the optical axis direction when the zoom lens 10 is extended from the retracted state thereof is determined by adding the moving amount of the cam ring 26 relative to the fixed ring portion 16 to the moving amount of the first lens group support frame 24 relative to the cam ring 26 (the advancing/retracting amount of the first lens group support frame 24 by the cam groove 26b). Furthermore, the moving amount of the second lens group 13d in the optical axis direction when the zoom lens 10 is extended from the retracted state thereof is determined by adding the moving amount of the cam ring 26 relative to the fixed ring portion 16 to the moving amount of the second lens group support frame 25 relative to the cam ring 26 (the advancing/retracting amount of the second lens group support frame 25 by the cam groove 26c).

Figure 6:
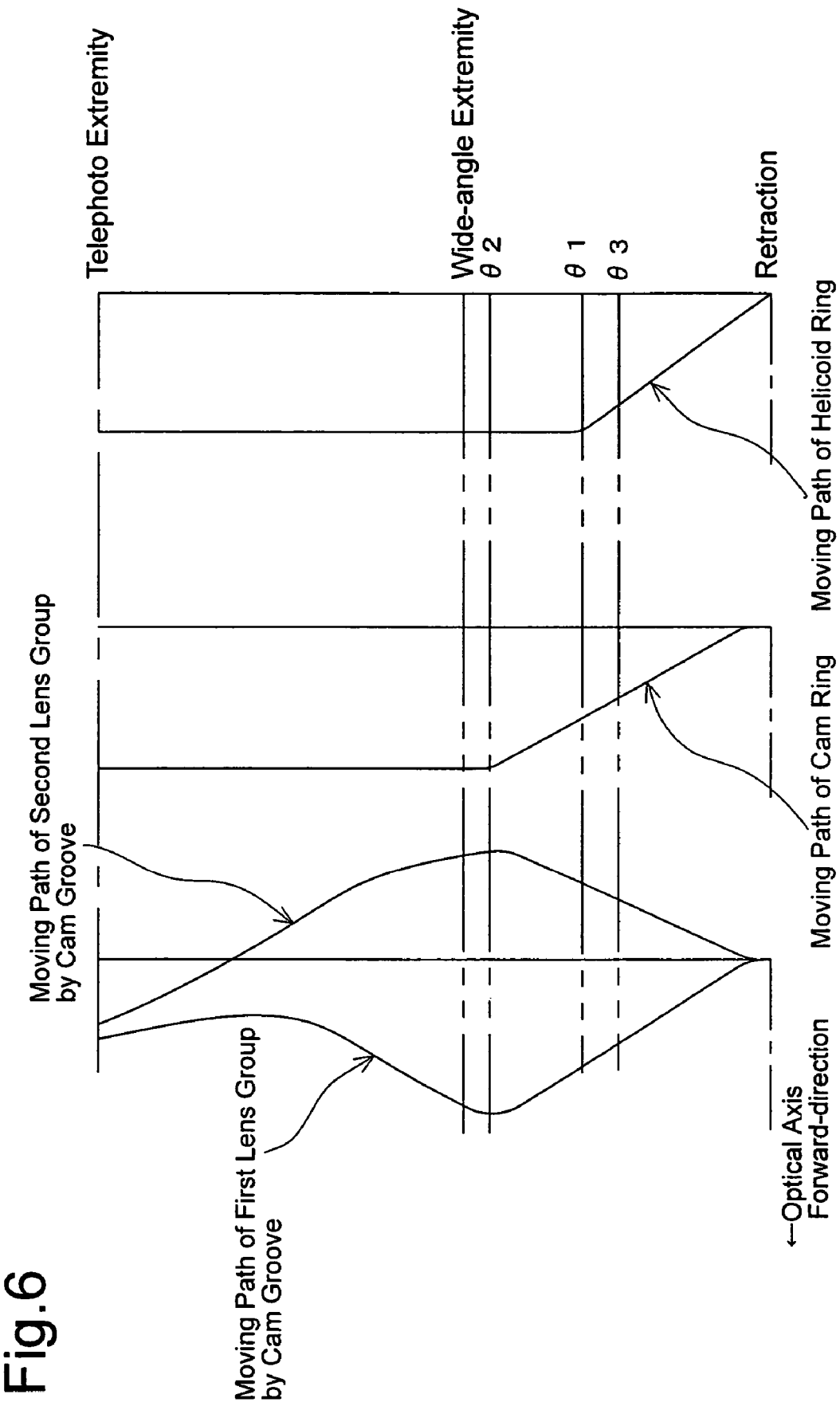
FIG. 6 is a conceptual diagram showing the moving paths of a helicoid ring and a cam ring and the moving paths of a first lens group and a second lens group by movement of the cam ring.
Figure 7:
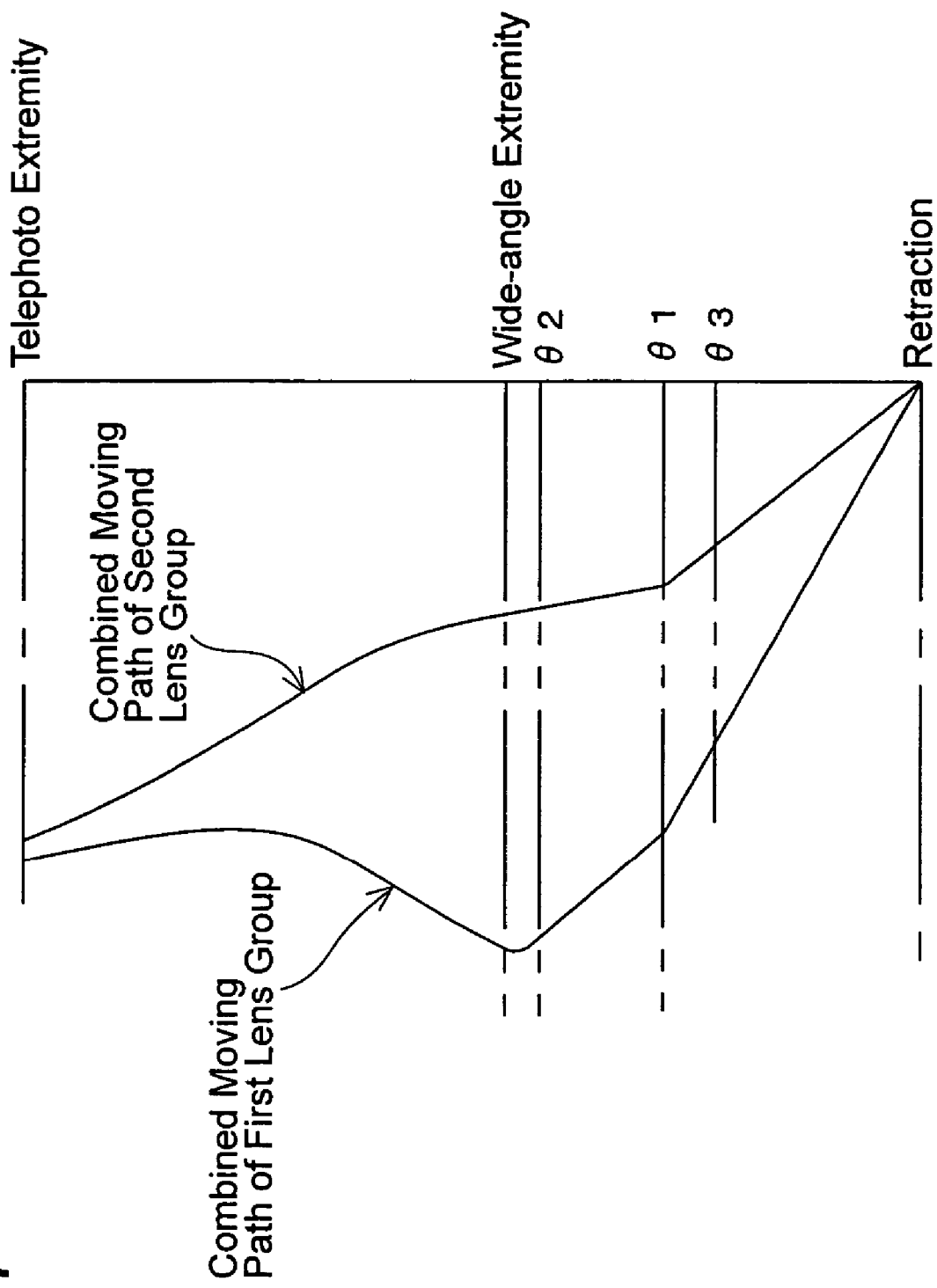
FIG. 7 is a conceptual diagram showing the combined moving path of each of the first lens group and the second lens group, in which the moving paths of the helicoid ring and the cam ring are included.

FIG. 6 shows the moving paths of the helicoid ring 18 and the cam ring 26 and the moving paths of the first lens group 13a and the second lens group 13d relative to the cam ring 26 (the cam diagrams of the cam grooves 26b and 26c). The vertical axis represents the amount of rotation (angular position) of the lens barrel from the retracted state of the zoom lens 10 to the telephoto extremity thereof, and the horizontal axis represents the amount of movement of the lens barrel in the optical axis direction. As shown in FIG. 6, the helicoid ring 18 is moved forward in the optical axis direction while rotating up to an angular position $\theta 1$ which is located at about the midpoint in the range of extension of the zoom lens 10 from the retracted position (shown in FIG. 1) to the wide-angle extremity (shown by the upper half of the zoom lens 10 from the photographing optical axis Z1 and shown in FIG. 2), whereas the helicoid ring 18 rotates at a fixed position in the optical axis direction as described above in the range of extension of the zoom lens 10 from the angular position $\theta 1$ to the telephoto extremity (shown by the lower half of the zoom lens 10 from the photographing optical axis Z1 and shown in FIG. 4). On the other hand, the cam ring 26 is moved forward in the optical axis direction while rotating up to an angular position $\theta 2$ which is located immediately behind the wide-angle extremity of the zoom lens 10 in the range of extension of the zoom lens 10 from the retracted position to the wide-angle extremity, whereas the cam ring 26 rotates at a fixed position in the optical axis direction as described above in the range of extension of the zoom lens 10 from the angular position $\theta 2$ to the telephoto extremity, similar to the helicoid ring 18. In the zooming range from the wide-angle extremity to the telephoto-extremity, the moving amount of the first lens group 13a in the optical axis direction is determined from the moving amount of the first lens group support frame 24 relative to the cam ring 26 which rotates at a fixed position in the optical axis direction (the advancing/retracting amount of the first lens group support frame 24 via the cam groove 26b), while the moving amount of the second lens group 13d in the optical axis direction is determined from the moving amount of the second lens group support frame 25 relative to the cam ring 26 which rotates at a fixed position in the optical axis direction (the advancing/retracting amount of the second lens group support frame 25 via the cam groove 26c). The focal length of the zoom lens 10 is varied by the relative movement in the optical axis direction between the first lens group 13a and the second lens group 13d. FIG. 7 shows the actual moving path of the first lens group 13a which is obtained by combining the moving amounts of the helicoid ring 18 and the cam ring 26 with the moving amount of the first lens group 13a by the cam groove 26b, and the actual moving path of the second lens group 13d which is obtained by combining the moving amounts of the helicoid ring 18 and the cam ring 26 with the moving amount by the cam groove 26c.

In the zooming range from the wide-angle extremity to the telephoto extremity, a focusing operation is performed by moving the first lens group 13a in the optical axis direction independently of other optical elements by the focusing motor MF.

The operations of the first lens group 13a and the second lens group 13d have been described above. In the zoom lens 10 of the present embodiment, the optical elements of the zoom lens 10 from the third lens group 13e to the CCD 13g are retractable away from the photographing position on the photographing optical axis Z1 to an off-optical-axis retracted position (radially retracted position) Z2 located above the photographing position as described above. In addition, by moving the optical elements from the third lens group 13e to the CCD 13g on a plane perpendicular to the photographing optical axis Z1, image shake can also be counteracted. The retracting mechanism and the image stabilizing mechanism will be discussed hereinafter.

Figure 17:
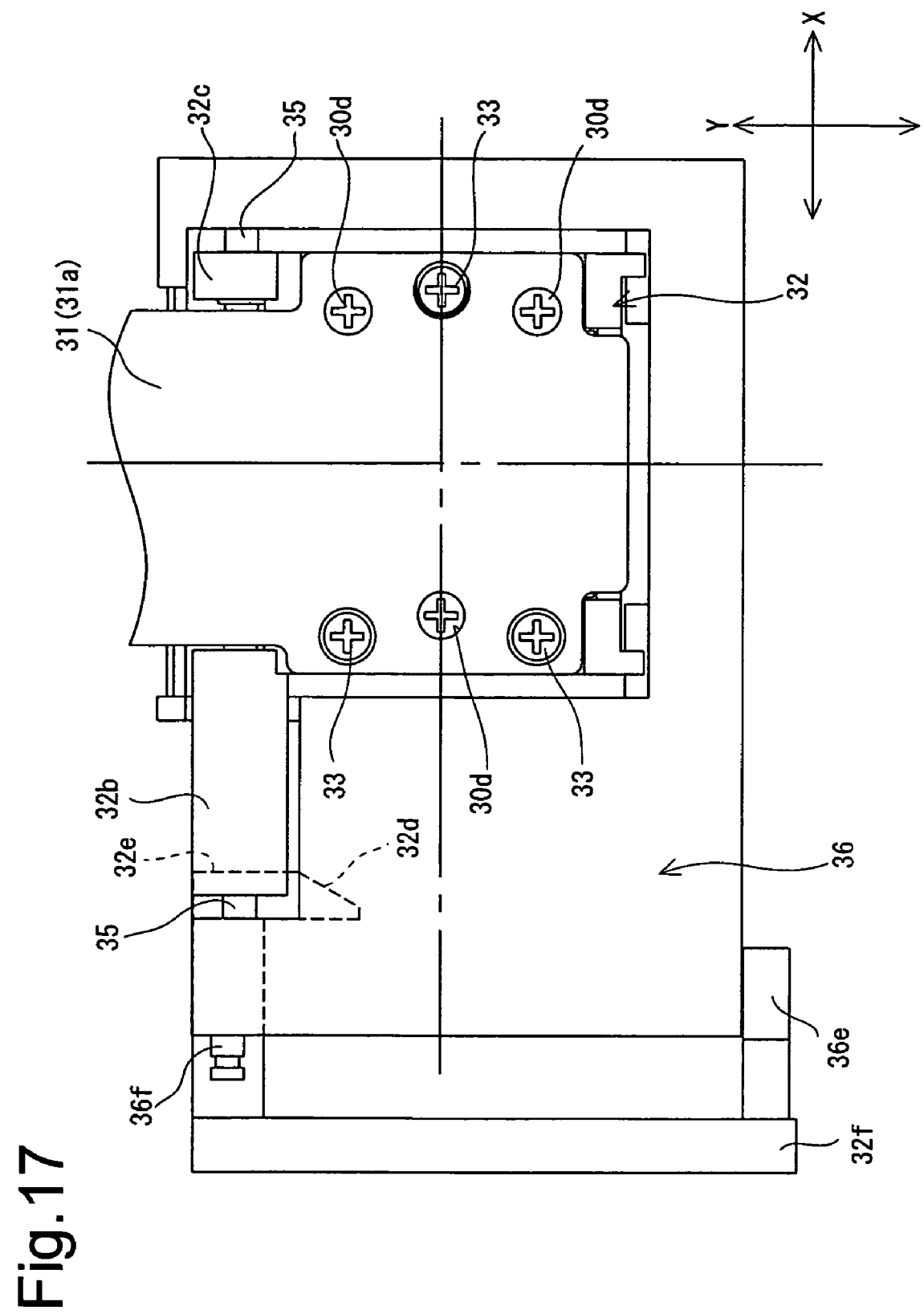
FIG. 17 is a rear view of the horizontal moving frame, the vertical moving frame and the associated elements shown in FIGS. 15 and 16.
Figure 18:
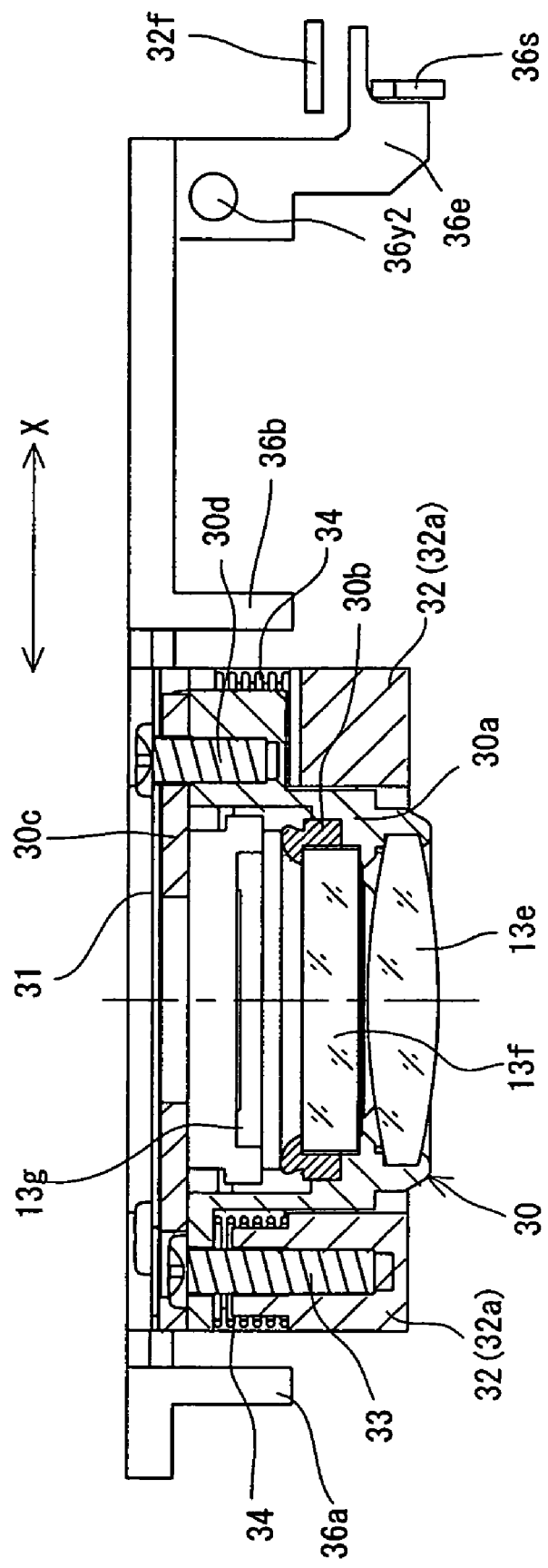
FIG. 18 is a cross-sectional view of the CCD holder, the horizontal moving frame, the vertical moving frame and other elements, taken along a D1-D1 line shown in FIG. 16.

As shown in FIGS. 8 and 18, the third lens group 13e, the low-pass filter 13f and the CCD 13g are held by a CCD holder 30 to be provided as a unit. The CCD holder 30 is provided with a holder body 30a, a sealing member 30b and a pressure plate 30c. The third lens group 13e is held by the holder body 30a at a front end aperture thereof. The low-pass filter 13f is held between a flange formed on an inner surface of the holder body 30a and the sealing member 30b, and the CCD 13g is held between the sealing member 30b and the pressure plate 30c. The holder body 30a and the pressure plate 30c are fixed to each other by three fixing screws 30d (see FIGS. 17 and 18) separately arranged around the central axis of the CCD holder 30 (the photographing optical axis Z1 in a photographic state of the zoom lens 10). The three fixing screws 30d also secure one end portion of an image transmission flexible PWB 31 to the rear surface of the pressure plate 30c so that a supporting substrate of the CCD 13g is electrically connected to the image transmission flexible PWB 31.

The image transmission flexible PWB 31 extends from its connection end at the CCD 13g to the retraction space SP in the housing 11. The image transmission flexible PWB 31 is provided with a first linear portion 31a, a U-shaped portion 31b, a second linear portion 31c, and a third linear portion 31d (see FIGS. 1 and 2). The first linear portion 31a is substantially orthogonal to the photographing optical axis Z1 and extends upward. The U-shaped portion 31b is bent forward from the first linear portion 31a. The second linear portion 31c extends downward from the U-shaped portion 31b. The third linear portion 31d is folded upward from the second linear portion 31c. The third linear portion 31d is fixed to an inner surface of the front wall 15a of the housing 11 therealong. The first linear portion 31a, the U-shaped portion 31b and the second linear portion 31c (except the third linear portion 31d) serve as a free-deformable portion which is freely resiliently deformable according to the motion of the CCD holder 30.

The CCD holder 30 is supported by a horizontal moving frame 32 via three adjusting screws 33 (see FIGS. 17 and 18) separately arranged around the central axis of the CCD holder 30 (the photographing optical axis Z1 in a ready-photograph state of the zoom lens 10). Three compression coil springs 34 are installed between the CCD holder 30 and the horizontal moving frame 32. The shaft portions of the three adjusting screws 33 are inserted into the three compression coil springs 34, respectively. When the tightening amounts of the adjusting screws 33 are changed, the respective compression amounts of the coil springs 34 are changed. The adjusting screws 33 and the compression coil springs 34 are provided at three different positions around the optical axis of the third lens group 13e, and accordingly, the inclination of the CCD holder 30 with respect to the horizontal moving frame 32, or the inclination of the optical axis of the third lens group 13e with respect to the photographing optical axis Z1, can be adjusted by changing the tightening amounts of the three adjusting screws 33.

Figure 15:
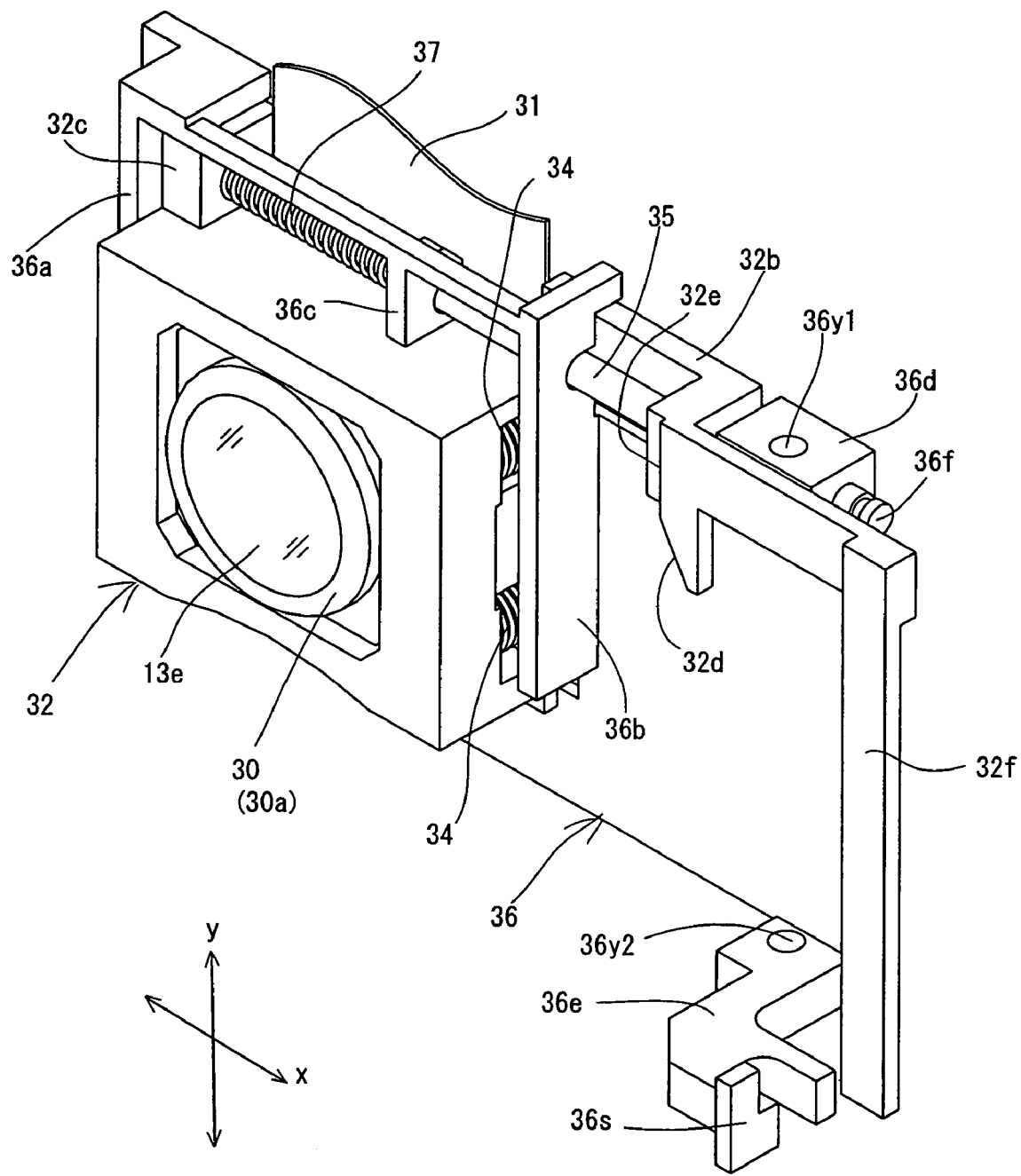
FIG. 15 is a front perspective view of a horizontal moving frame and a vertical moving frame which support the CCD holder, and associated elements.
Figure 16:
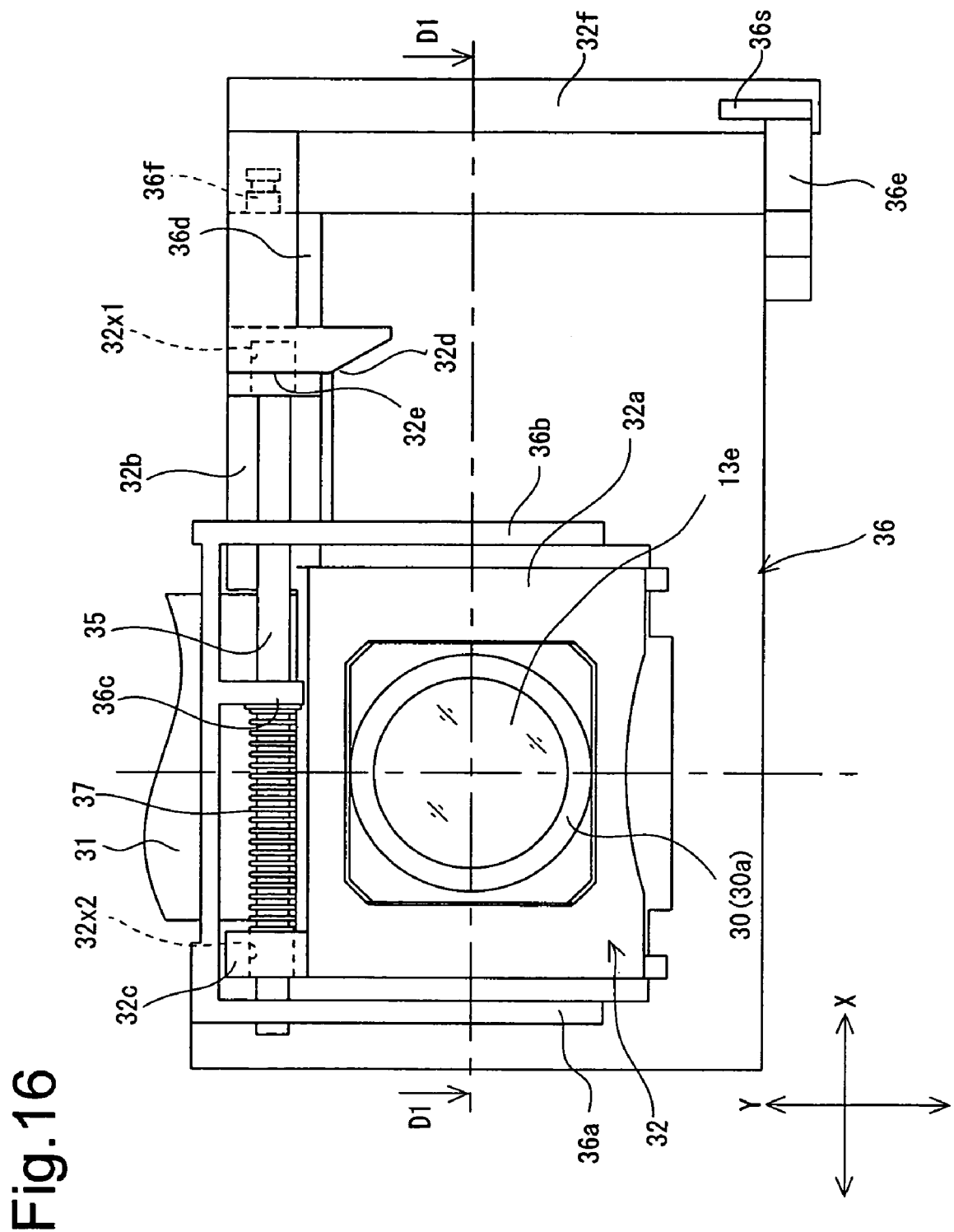
FIG. 16 is a front view of the horizontal moving frame, the vertical moving frame and the associated elements shown in FIG. 15.

As shown in FIG. 15, the horizontal moving frame 32 is supported by a vertical moving frame 36 to be movable with respect thereto via a horizontal guide shaft 35 extending in the x-axis direction. Specifically, the horizontal moving frame 32 is provided with a rectangular frame portion 32a which encloses the CCD holder 30 and an arm portion 32b which extends horizontally from the frame portion 32a. A spring supporting protrusion 32c is formed on an upper surface of the frame portion 32a, and an inclined surface 32d and a position restricting surface 32e are formed on an end portion of the arm portion 32b. The position restricting surface 32e is a flat surface parallel to the y-axis. On the other hand, the vertical moving frame 36 is provided with a pair of motion restricting frames 36a and 36b, a spring supporting portion 36c, an upper bearing portion 36d, and a lower bearing portion 36e. The pair of motion restricting frames 36a and 36b are provided spaced apart in the x-axis direction. The spring supporting portion 36c is located between the pair of the motion restricting frames 36a and 36b. The upper bearing portion 36d is located on a line extended from the spring supporting portion 36c in the x-axis direction. The lower bearing portion 36e is located below the upper bearing portion 36d. As shown in FIG. 16, the horizontal moving frame 32 is supported by the vertical moving frame 36 in a state where the frame portion 32a is positioned in the space between the pair of motion restricting frames 36a and 36b and where the inclined surface 32d and the position restricting surface 32e of the arm portion 32b are positioned between the motion restricting frame 36b and the upper bearing portion 36d.

One end of the horizontal guide shaft 35 is fixed to the motion restricting frame 36a of the vertical moving frame 36, and the other end of the horizontal guide shaft 35 is fixed to the upper bearing portion 36d of the vertical moving frame 36. Two through-holes are respectively formed in the motion restricting frame 36b and the spring supporting portion 36c to be horizontally aligned to each other so as to allow the horizontal guide shaft 35 to pass through the motion restricting frame 36b and the spring supporting portion 36c. Horizontal through-holes 32x1 and 32x2 (see FIG. 16) into which the horizontal guide shaft 35 is inserted are formed in the arm portion 32b and the spring supporting protrusion 32c of the horizontal moving frame 32, respectively. The horizontal through-holes 32x1 and 32x2 of the horizontal moving frame 32 and the aforementioned two through-holes which are respectively formed in the motion restricting frame 36b and the spring supporting portion 36c are horizontally aligned with each other. Since the horizontal guide shaft 35 is slidably fitted in the horizontal through-holes 32x1 and 32x2, the horizontal moving frame 32 is supported by the vertical moving frame 36 to be movable with respect to the vertical moving frame 36 in the x-axis direction. A horizontal moving frame biasing spring 37 is installed on the horizontal guide shaft 35 between the spring supporting protrusion 32c and the spring supporting portion 36c. The horizontal moving frame biasing spring 37 is a compression coil spring and biases the horizontal moving frame 32 in a direction (leftward as viewed in FIG. 16) to make the spring supporting protrusion 32c approach the motion restricting frame 36a.

Vertical through-holes 36y1 and 36y2 (see FIG. 15) are further formed in the upper bearing portion 36d and the lower bearing portion 36e of the vertical moving frame 36, respectively, which extend in a line along the y-axis direction which is orthogonal to the photographing optical axis Z1. The vertical through-hole 36y1 and the vertical through-hole 36y2 are vertically aligned, and a vertical guide shaft 38 (see FIGS. 8 and 9) passes through vertical through-hole 36y1 and the vertical through-hole 36y2. Both ends of the vertical guide shaft 38 are fixed to the housing 11, and therefore, the vertical moving frame 36 can move along the vertical guide shaft 38 in the y-axis direction inside the camera. More specifically, the vertical moving frame 36 can move between the photographing position shown in FIG. 1 and the retracted position shown in FIG. 2. When the vertical moving frame 36 is positioned in the photographing position as shown in FIG. 2, the centers of the third lens group 13e, the low-pass filter 13f and the CCD 13g in the CCD holder 30 are positioned on the photographing optical axis Z1. When the vertical moving frame 36 is positioned in the radially retracted position as shown in FIG. 1, the centers of the third lens group 13e, the low-pass filter 13f and the CCD 13g are positioned in the off-optical-axis retracted position Z2 that is located above the fixed ring portion 16.

The vertical moving frame 36 is provided with a spring hooking portion 36f which projects horizontally from a side surface of the vertical moving frame 36 in a direction away from the vertical through-hole 36y1, and a vertical moving frame biasing spring 39 is extended between the spring hooking portion 36f and a spring hooking portion 11a (see FIG. 8) fixed to the housing 11 therein. The vertical moving frame biasing spring 39 is an extension coil spring and biases the vertical moving frame 36 downward (i.e., toward the photographing position thereof shown in FIG. 2).

As described above, the horizontal moving frame 32 that holds the CCD holder 30 is supported by the vertical moving frame 36 to be movable in the x-axis direction with respect to the vertical moving frame 36, and the vertical moving frame 36 is supported by the housing 11 via the vertical guide shaft 38 to be movable in the y-axis direction with respect to the housing 11. Image shake can be counteracted by moving the CCD holder 30 in the x-axis direction and the y-axis direction. To this end, the zoom lens 10 is provided with a driving device which achieves such movement of the CCD holder 30. This driving device will be discussed hereinafter.

Figure 9:
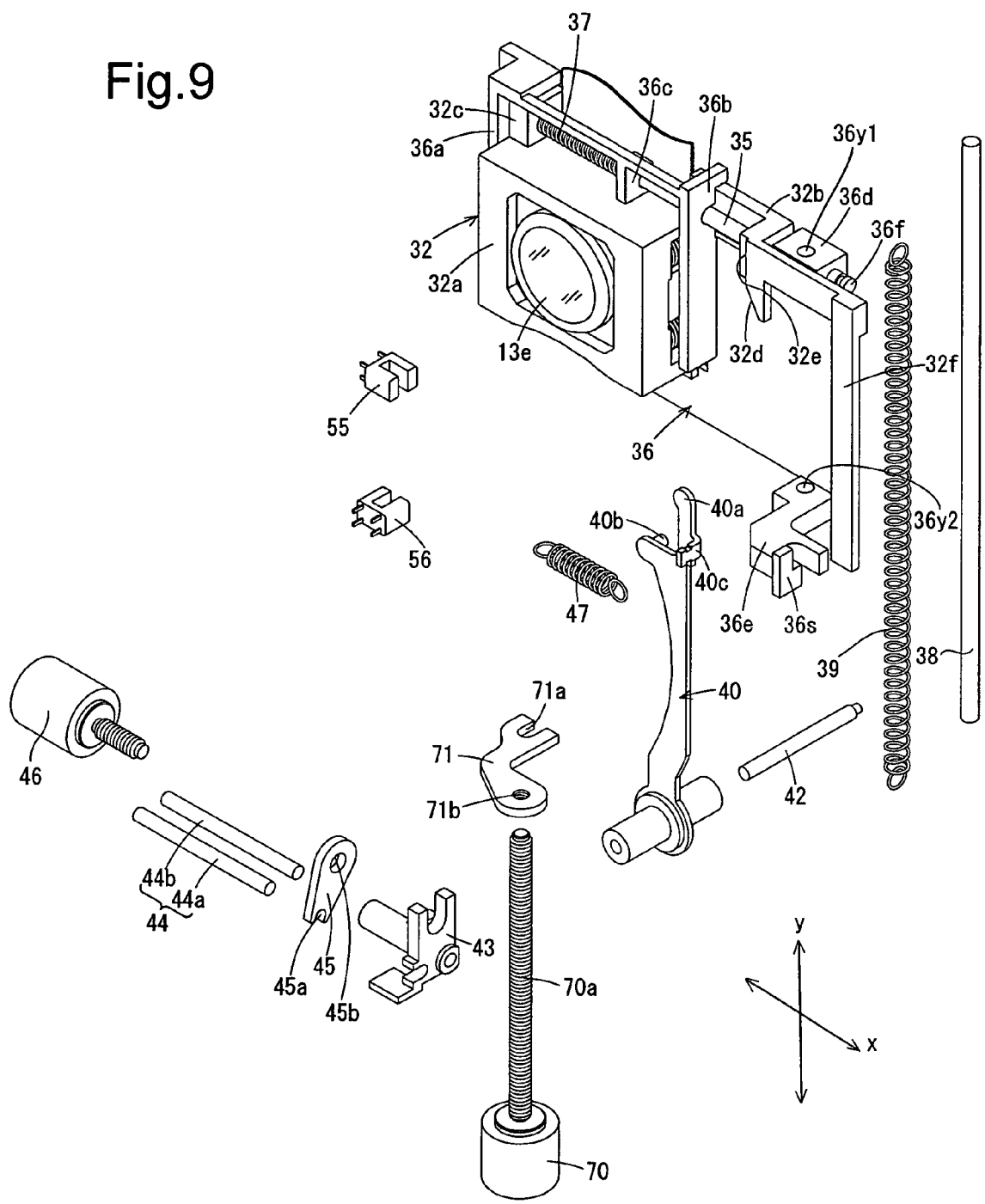
FIG. 9 is an exploded perspective view of elements of an image stabilizing mechanism and a radially-retracting mechanism which are shown in FIG. 8.
Figure 12:
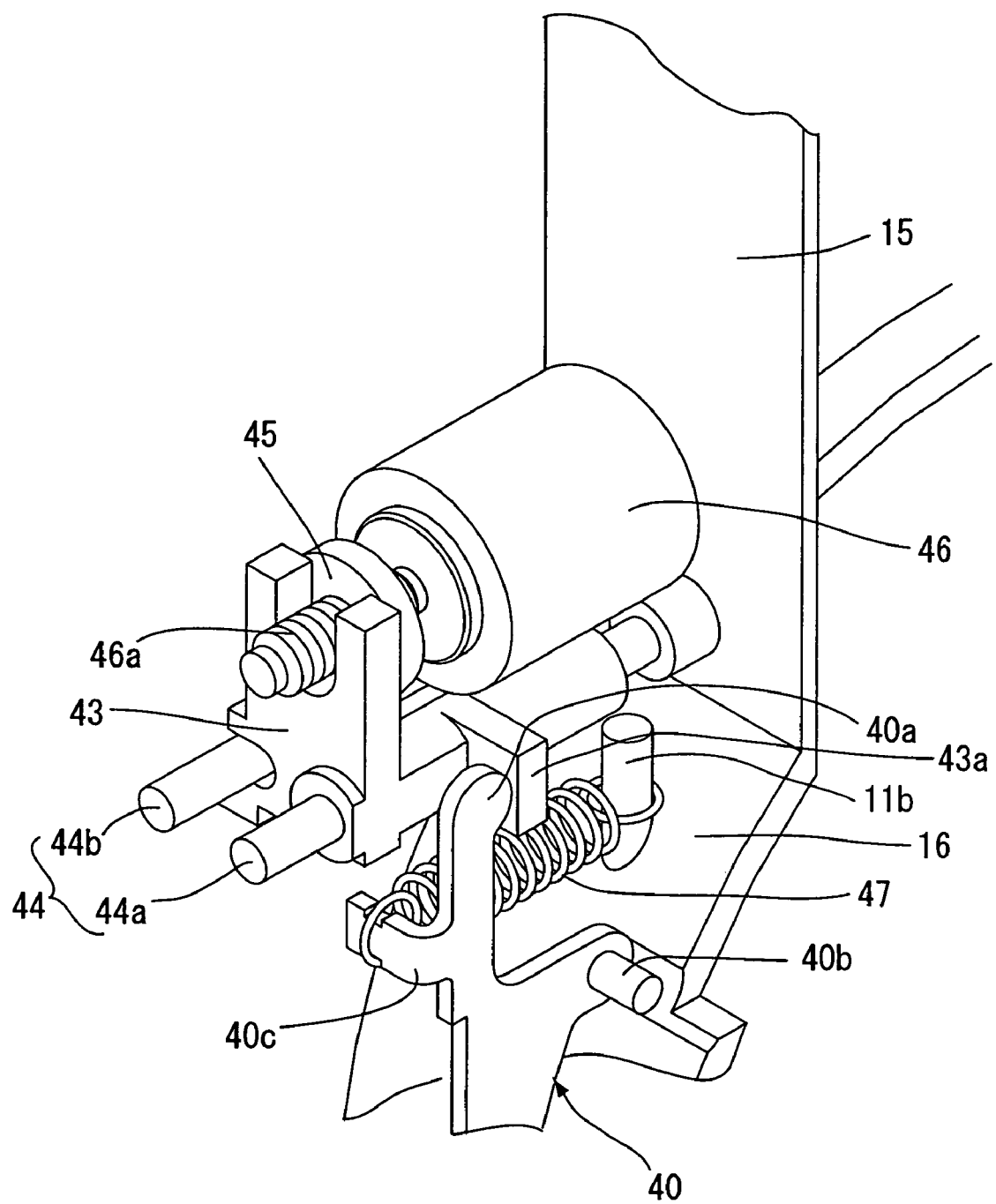
FIG. 12 is a rear perspective view of a portion of the image stabilizing mechanism as viewed from the rear side of FIGS. 10 and 11.
Figure 13:
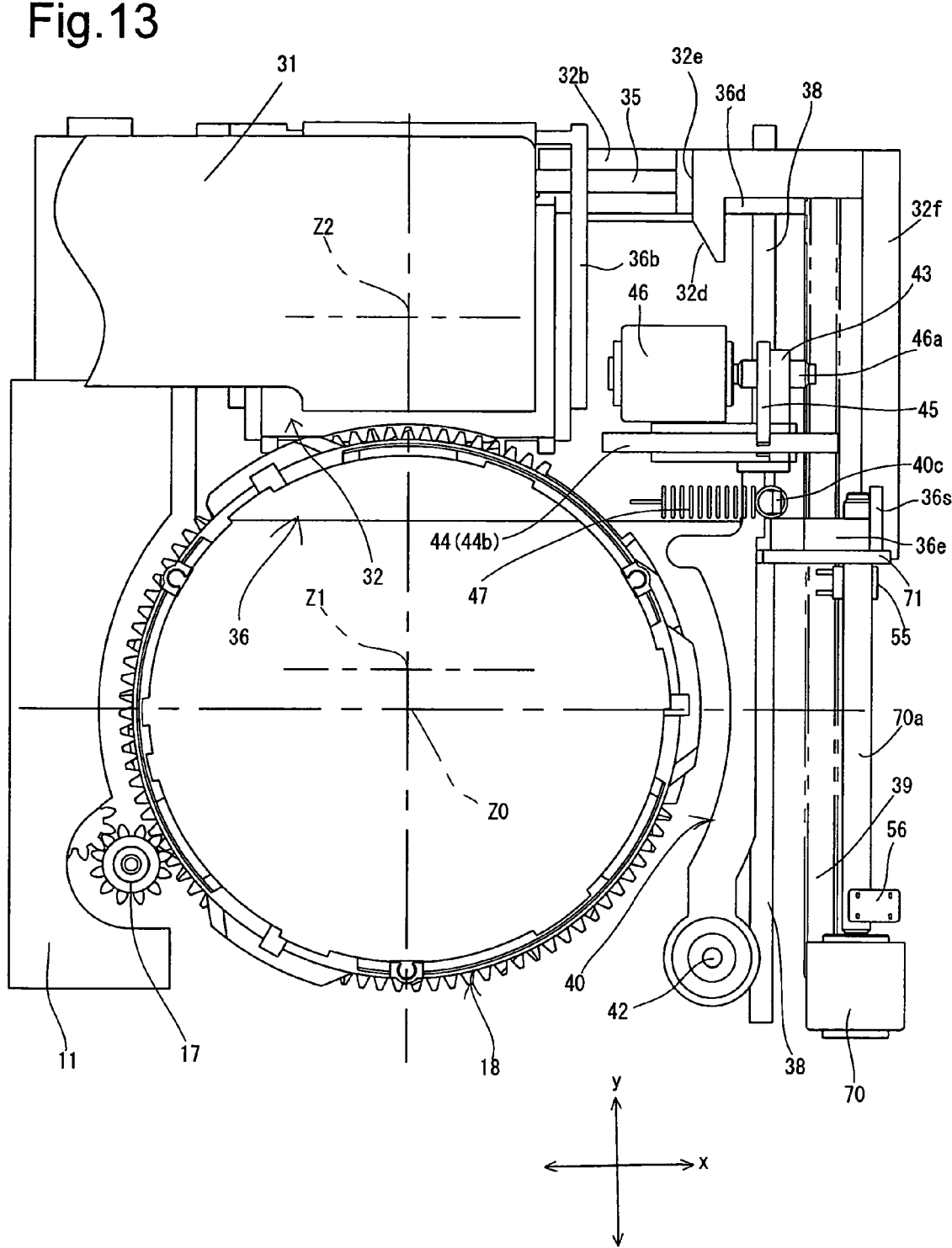
FIG. 13 is a front elevational view of the image stabilizing mechanism and the radially-retracting mechanism in the state shown in FIG. 10, as viewed from the front in the optical axis direction.
Figure 14:
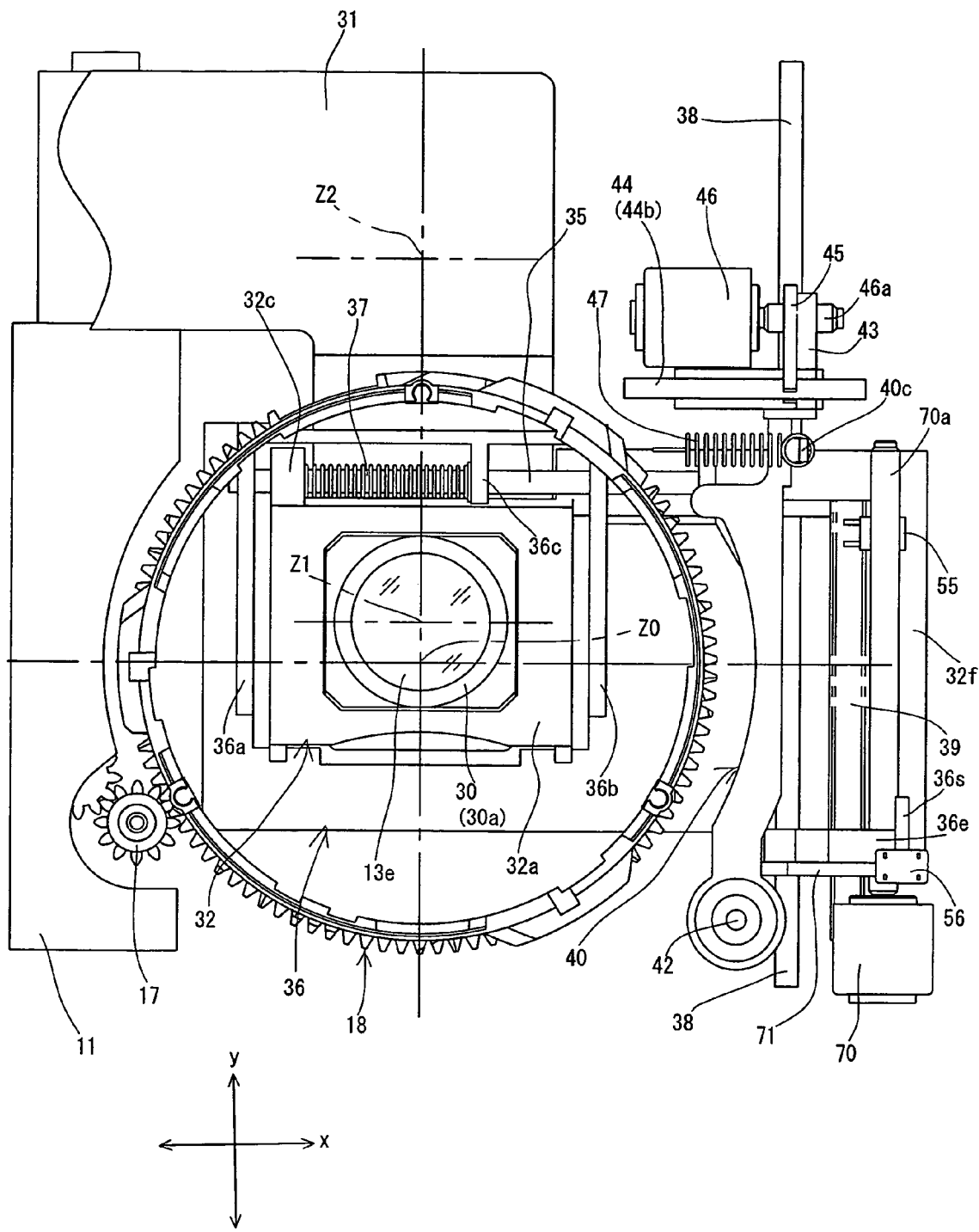
FIG. 14 is a front elevational view of the image stabilizing mechanism and the radially-retracting mechanism in the state shown in FIG. 11, as viewed from the front in the optical axis direction.
Figure 19:
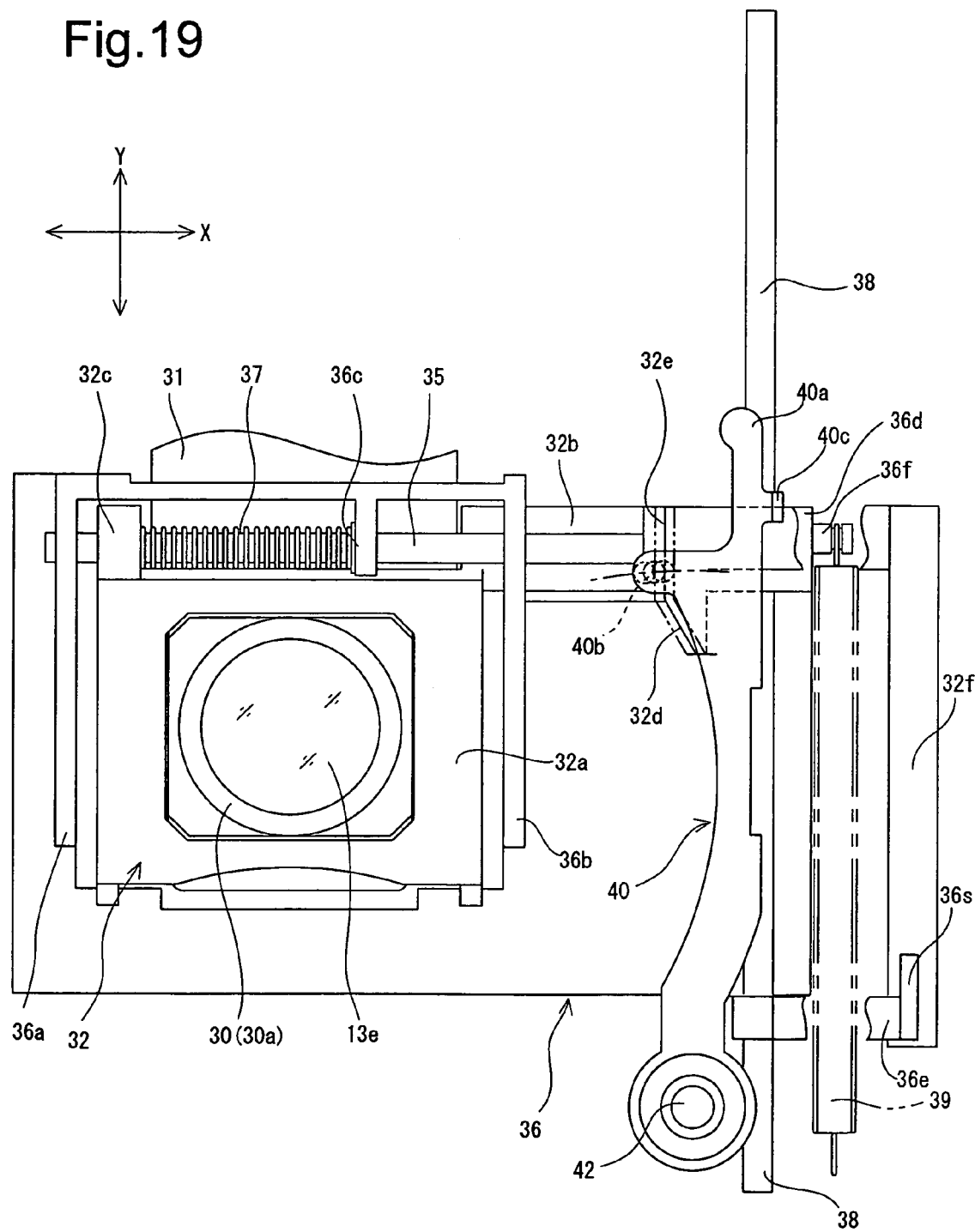
FIG. 19 is a front elevational view of the elements shown in FIGS. 15 through 18 and other associated elements, illustrating an image stabilizing action in the horizontal direction by an operation of a horizontal driving lever.

This driving device is provided with a horizontal driving lever 40. As shown in FIGS. 9 and 19, the horizontal driving lever 40 is pivoted at the lower end thereof on a lever pivot shaft 42 which provided in the housing 11 and fixed thereto to be parallel to the photographing optical axis Z1. The horizontal driving lever 40 is provided at the upper end of the horizontal driving lever 40 with a force-applying end 40a. The horizontal driving lever 40 is provided in the vicinity of the force-applying end 40a with an operation pin 40b which projects rearward in the optical axis direction and a spring hooking portion 40c which projects forward in the optical axis direction. As shown in FIG. 12, the force-applying end 40a of the horizontal driving lever 40 abuts against a lug 43a of a moving member 43. The moving member 43 is supported by a pair of parallel guide bars 44 (44a and 44b) to be slidable thereon in the x-axis direction, and a driven nut member 45 abuts against the moving member 43. The driven nut member 45 is provided with a female screw hole 45b and a rotation restricting groove 45a (see FIG. 9) which is slidably fitted on the guide bar 44b. A drive shaft (a feed screw) 46a of a first stepping motor 46 is screwed into the female screw hole 45b. As shown in FIGS. 13 and 14, the driven nut member 45 abuts against the moving member 43 from the left side. One end of an extension coil spring 47 is hooked on the spring hooking portion 40c of the horizontal driving lever 40, and the other end of the spring 47 is hooked on a spring hooking portion 11b which projects from an inner surface of the housing 11 (see FIG. 12). The extension coil spring 47 biases the horizontal driving lever 40 in a direction to bring the moving member 43 to abut against the driven nut member 45, i.e., in a counterclockwise direction as viewed in FIGS. 13, 14 and 19. Due to this structure, driving the first stepping motor 46 causes the driven nut member 45 to move along the pair of guide bars 44, and at the same time causes the moving member 43 to move together with the driven nut member 45, thus causing the horizontal driving lever 40 to swing about the lever pivot shaft 42. Specifically, moving the driven nut member 45 rightward as viewed in FIGS. 13 and 14 causes the driven nut member 45 to press the moving member 43 in the same direction against the biasing force of the extension spring 47, thus causing the horizontal driving lever 40 to rotate clockwise as viewed in FIGS. 13 and 14. Conversely, moving the driven nut member 45 leftward as viewed in FIGS. 13 and 14 causes the moving member 43 to move in the same direction while following the leftward movement of the driven nut member 45 due to the biasing force of the extension coil spring 47, thus causing the horizontal driving lever 40 to rotate counterclockwise as viewed in FIGS. 13 and 14.

As shown in FIG. 19, the operation pin 40b of the horizontal driving lever 40 abuts against the position restricting surface 32e that is provided on the end portion of the arm portion 32b of the horizontal moving frame 32. Since the horizontal moving frame 32 is biased leftward as viewed in FIG. 19 by the horizontal moving frame biasing spring 37, the operation pin 40b remains in contact with the position restricting surface 32e. When the horizontal driving lever 40 swings, the position of the operation pin 40b changes along the x-axis direction, so that the horizontal moving frame 32 moves along the horizontal guide shaft 35. Specifically, rotating the horizontal driving lever 40 clockwise as viewed in FIG. 19 causes the operation pin 40b to press the position restricting surface 32e, which causes the horizontal moving frame 32 to move rightward as viewed in FIG. 19 against the biasing force of the horizontal moving frame biasing spring 37. Conversely, rotating the horizontal driving lever 40 counterclockwise as viewed in FIG. 19 causes the operation pin 40b to move in a direction away from the position restricting surface 32e (leftward as viewed in FIG. 19), which causes the horizontal moving frame 32 to move in the same direction while following the leftward movement of the operation pin 40b due to the biasing force of the horizontal moving frame biasing spring 37.

As shown in FIGS. 8 through 11, 13 and 14, a second stepping motor (common actuator) 70 and a driven nut member (linearly movable member) 71 are installed in the close vicinity of the vertical guide shaft 38. The second stepping motor 70 is provided with a drive shaft (feed screw shaft) 70a which extends parallel to said vertical guide shaft 38 and with which the driven nut member 71 is screw-engaged. As shown in FIG. 9, the driven nut member 71 is provided with a rotation restricting groove 71a which is slidably fitted on the vertical guide shaft 38, and a female screw hole 71b which is screw-engaged with the drive shaft 70a. Rotating the drive shaft 70a forward and reverse by driving the second stepping motor 70 causes the driven nut member 71 to move upwards and downwards in the y-axis direction along the vertical guide shaft 38. As shown in FIGS. 10, 11, 13 and 14, the driven nut member 71 is in contact with a vertical moving frame 36 from bottom thereof. Due to this structure, driving the second stepping motor 70 causes the driven nut member 71 to move along the vertical guide shaft 38, thus causing the vertical moving frame 36 to move along the vertical guide shaft 38. Specifically, moving the driven nut member 71 upward causes the driven nut member 71 to push a lower bearing portion 36e of the vertical moving frame 36 upward, so that the vertical moving frame 36 moves upward against the biasing force of the vertical moving frame biasing spring

39. Conversely, moving the driven nut member 71 downward causes the vertical moving frame 36 to move downward together with the driven nut member 71 by the biasing force of the vertical moving frame biasing spring 39.

In the above-described structure, the horizontal moving frame 32 can be caused to move left or right in the x-axis direction by driving the first stepping motor 46 forward or reverse. Furthermore, the vertical moving frame 36 can be caused to move upwards or downwards in the y-axis direction by driving the second stepping motor 70 forward or reverse.

The CCD holder 30 is supported by a horizontal moving frame 32. The horizontal moving frame 32 is provided with a plate portion 32*f* which is formed as a part of the arm portion 32*b* to extend downward from the arm portion 32*b*. The plate portion 32*f* has a substantially inverted-L shape as viewed from the front of the camera, and is elongated in the y-axis direction so that the lower end of the plate portion 32*f* reaches down to the close vicinity of the lower bearing portion 36*e*. Additionally, the vertical moving frame 36 is provided at the end of the lower bearing portion 36*e* with a plate portion 36*s*. As shown in FIGS. 8 through 11 and 13 through 14, two photo sensors 55 and 56, each having a light emitter and a light receiver which are spaced apart from each other are installed in the housing 11. The initial position of the horizontal moving frame 32 can be detected by the photo sensor 55 when the plate portion 32*f* passes between the light emitter and the light receiver of the photo sensor 55. The plate portion 32*f* and the photo sensor 55 constitute a photo interrupter. Likewise, the initial position of the vertical moving frame 36 can be detected by the photo sensor 56 when the plate portion 36*s* passes between the light emitter and the light receiver of the photo sensor 56. The plate portion 36*s* and the photo sensor 56 constitute a photo interrupter.

The present embodiment of the zoom lens camera has an image-shake detection sensor 57 (see FIG. 5) which detects the angular velocity around two axes (the vertical and horizontal axes of the camera) orthogonal to each other in a plane perpendicular to the photographing optical axis Z1. The magnitude and the direction of camera shake (vibrations) are detected by the image-shake detection sensor 57. The control circuit 14*a* determines a moving angle by time-integrating the angular velocity of the camera shake in the two axial directions, detected by the image-shake detection sensor 57. Subsequently, the control circuit 14*a* calculates from the moving angle the moving amounts of the image on a focal plane (imaging surface/light receiving surface of the CCD 13*g*) in the x-axis direction and in the y-axis direction. The control circuit 14 further calculates the driving amounts and the driving directions of the horizontal moving frame 32 and the vertical moving frame 36 for the respective axial directions (driving pulses for the first stepping motor 46 and the second stepping motor 70) in order to counteract the camera shake. Thereupon, the first stepping motor 46 and the second stepping motor 70 are actuated and the operations thereof are controlled in accordance with the calculated values. In this manner, each of the horizontal moving frame 32 and the vertical moving frame 36 is driven in the calculated direction by the calculated amount in order to counteract the shake of the photographing optical axis Z1 to thereby stabilize the image on the focal plane. The camera can be put into this image stabilization mode by turning on a photographing mode select switch 14*e* (see FIG. 5). If the switch 14*e* is in an off-state, the image stabilizing capability is deactivated so that a normal photographing operation is performed.

The present embodiment of the zoom lens camera uses part of the above-described image stabilizing mechanism to perform the retracting operation (radially retracting operation) of the third lens group 13*e*, the low-pass filter 13*f* and the CCD 13*g* toward the off-optical-axis retracted position Z2 into the retraction space SP when the zoom lens 10 is retracted from a photographic state. As shown in FIGS. 8 through 11, 13 and 14, the second stepping motor 70 is installed with the body thereof being positioned at the bottom, and the drive shaft 70*a* that extends upwards from the body of the second stepping motor 70 has a length greater than the amount of retracting movement of the vertical moving frame 36 in the y-axis direction. The vertical guide shaft 38, which is parallel to the drive shaft 70*a*, has a length greater than the length of the drive shaft 70*a*. This configuration makes it possible to move the vertical moving frame 36 in the y-axis direction largely beyond a predetermined range of movement of the vertical moving frame 36 which is necessary for image stabilization, i.e., for counteracting image shake. Namely, the third lens group 13*e*, the low-pass filter 13*f* and the CCD 13*g*, which are supported by the vertical moving frame 36, can be moved from a position on the photographing optical axis Z1 (the position shown in FIGS. 11 and 14) to the off-optical-axis retracted position Z2 (the position shown in FIGS. 10 and 13).

The control circuit 14*a* controls the position of the vertical moving frame 36 by driving the second stepping motor 70 in accordance with the status of the zoom lens 10. Firstly, when the zoom lens 10 is in the photographic state (i.e., when the focal length of the zoom lens 10 is set in between the wide-angle extremity and the telephoto extremity), the driven nut member 71 is positioned in the vicinity of the lower end of the drive shaft 70*a* so that the vertical moving frame 36 (together with the third lens group 13*e*, the low-pass filter 13*f* and the CCD 13*g*) is positioned on the photographing optical axis Z1. In this photographic state, the above described image stabilizing operation can be performed by driving the first stepping motor 46 and the second stepping motor 70 in the x-axis direction and the y-axis direction as appropriate. This image stabilizing operation is performed with the third lens group 13*e*, the low-pass filter 13*f* and the CCD 13*g* remaining on the photographing optical axis Z1. Namely, during the image stabilizing operation, the third lens group 13*e*, the low-pass filter 13*f* and the CCD 13*g* are not moved largely toward the off-optical-axis retracted position Z2 beyond the photographing optical axis Z1.

The zoom lens 10 enters the photographic state shown in FIG. 2 when the main switch 14*d* (see FIG. 5) of the camera is turned ON, and enters the retracted state shown in FIG. 1 when the main switch 14*d* is turned OFF. When the zoom lens changes from the photographic state to the retracted state upon the main switch being turned OFF, the control circuit 14*a* drives the zoom motor MZ to perform the retracting operation of the zoom lens 10 and simultaneously drives the second stepping motor 70 to move the driven nut member 71 upward to a position at the close vicinity of the upper end of the drive shaft 70*a*. Thereupon, the driven nut member 71 lifts the vertical moving frame 36 against the biasing force of the vertical moving frame biasing spring 39, which causes the vertical moving frame 36 to move to the off-optical-axis retracted position Z2 as shown in FIG. 1 while being guided along the vertical guide shaft 38. Consequently, the third lens group 13*e*, the low-pass filter 13*f* and the CCD 13*g* are retracted radially outwards to the off-optical-axis retracted position Z2 from a position on the photographing optical axis Z1.

The retracting operation of the vertical moving frame 36, i.e., the operation of the second stepping motor 70, is controlled to be completed at an angular position θ3 (shown in FIGS. 6 and 7) before the zoom lens 10 is fully retracted. Subsequently, from the angular position θ3 the helicoid ring 18 and the cam ring 26 further move rearward in the optical axis direction while rotating. Thereafter, when the helicoid ring 18 and the cam ring 26 reach their respective retracted positions shown in FIG. 1, the cylindrical portion 25b of the second lens group support frame 25 that holds the second lens group 13d is retracted into the space in the housing 11 which is formerly occupied by the vertical moving frame 36 when the zoom lens 10 is in the photographic state. In this manner, the thickness of the photographing optical system in the optical axis direction can be reduced in the retracted state of the zoom lens 10, which makes it possible to reduce the thickness of the zoom lens 10, which in turn makes it possible to reduce the thickness of a camera incorporating the zoom lens 10. The timing of the commencement of the retracting operation of the vertical moving frame 36 can be freely determined within the range between the wide-angle extremity and the angular position θ3 shown in FIGS. 6 and 7. In the present invention, the retracting operation of the vertical moving frame 36 that is carried out by the second stepping motor 70 is controlled so as to be started in the vicinity of the angular position θ2, at which the cam ring 26 changes its operating state between a state in which the cam ring 26 rotates at a fixed position and a state in which the cam ring 26 rotates while moving forward or rearward.

When the zoom lens 10 changes from the retracted state shown in FIG. 1 to the photographic state shown in FIG. 2, operations of the zoom lens 10 which are reverse to the above described operations of the zoom lens 10 are performed. Firstly, the control circuit 14a actuates the zoom motor MZ to start the advancing operation of the zoom lens 10 upon the main switch 14d being turned ON. At this stage, the second stepping motor 70 has not been actuated. The advancing operation of the zoom motor MZ causes the second support frame 25, which supports the second lens group 13d, to move forward from the rearmost position shown in FIG. 1. This forward movement of the second support frame 25 opens the space below the vertical moving frame 36 positioned in the retracted position (and above the photographing optical axis Z1). The advancing operation of the second support frame 25 to a position where the second support frame 25 is not overlapped by the vertical moving frame 36 in the y-axis direction has been completed by the time the lens barrel 10 reaches the angular position θ3 shown in FIGS. 6 and 7. From this state, the control circuit 14a starts driving the second stepping motor 70 so that the driven nut member 71 moves to a position in the vicinity of the lower end of the drive shaft 70a while being guided along the vertical guide shaft 38. At the same time, the vertical moving frame 36 follows the driven nut member 71 to move downward to a position on the photographing optical axis Z1, which is shown in FIGS. 11 and 14, by the biasing force of the vertical moving frame biasing spring 39.

Figure 20:
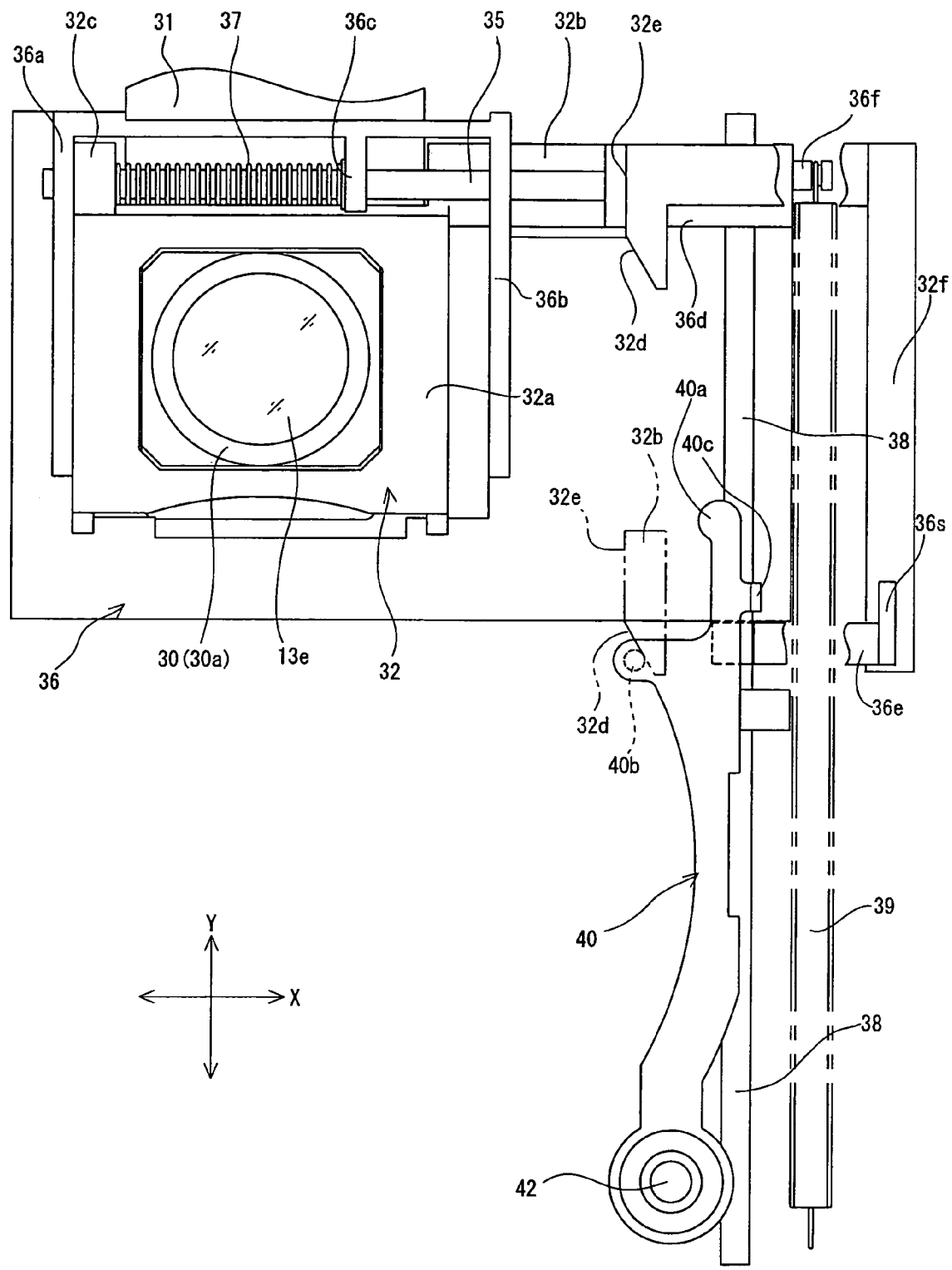
FIG. 20 is a front elevational view of elements shown in FIG. 19 for illustrating the relationship between the horizontal driving lever and the vertical motion of the CCD holder, the horizontal moving frame, and the vertical moving frame.

When the vertical moving frame 36 is retracted upward to the off-optical-axis retracted position Z2 as shown in FIG. 20, the position restricting surface 32e that is provided on the arm portion 32b of the horizontal moving frame 32 is disengaged from the operation pin 40b that is provided on the horizontal driving lever 40. This disengagement of the position restricting surface 32e from the operation pin 40b causes the horizontal moving frame 32 to move leftward as viewed in FIG. 20 by the biasing force of the horizontal moving frame biasing spring 37 up to a point at which the frame portion 32a of the horizontal moving frame 32 abuts against the motion restricting frame 36a of the vertical moving frame 36. From this state, upon the vertical moving frame 36 being moved down to the photographing optical axis Z1, the inclined surface 32d of the horizontal moving frame 32 comes in contact with the operation pin 40b as shown by two-dot chain lines in FIG. 20. The inclined surface 32d is inclined so as to guide the operation pin 40b to the position restricting surface 32e side according to the downward motion of the vertical moving frame 36. Therefore, upon the vertical moving frame 36 being moved down to the photographing position, the operation pin 40b is again engaged with the position restricting surface 32e as shown in FIG. 19 and the frame portion 32a of the horizontal moving frame 32 returns to the neutral position thereof between the motion restricting frame 36a and the motion restricting frame 36b.

As can be understood from the above description, in the present embodiment of the zoom lens 10, the vertical moving frame 36 is lifted from a position on the photographing optical axis Z1 by the driving force of the second stepping motor 70 to move a retractable optical unit which is composed of the third lens group 13e, the low-pass filter 13f and the CCD 13g to the off-optical-axis retracted position Z2 (into the retraction space SP) when the zoom lens is retracted to the retracted position. The second lens group 13d enters the space on the photographing optical axis Z1 which is created after the third lens group 13e, the low-pass filter 13f and the CCD 13g are retracted to the off-optical-axis retracted position Z2 as shown in FIG. 1, which makes it possible to reduce the thickness of the zoom lens 10 in the direction of the photographing optical axis Z1, and in turn makes it possible to achieve a compact camera incorporating the zoom lens 10 when the camera is in a non-photographing state even though the camera includes an optical image stabilizer.

Figure 21:
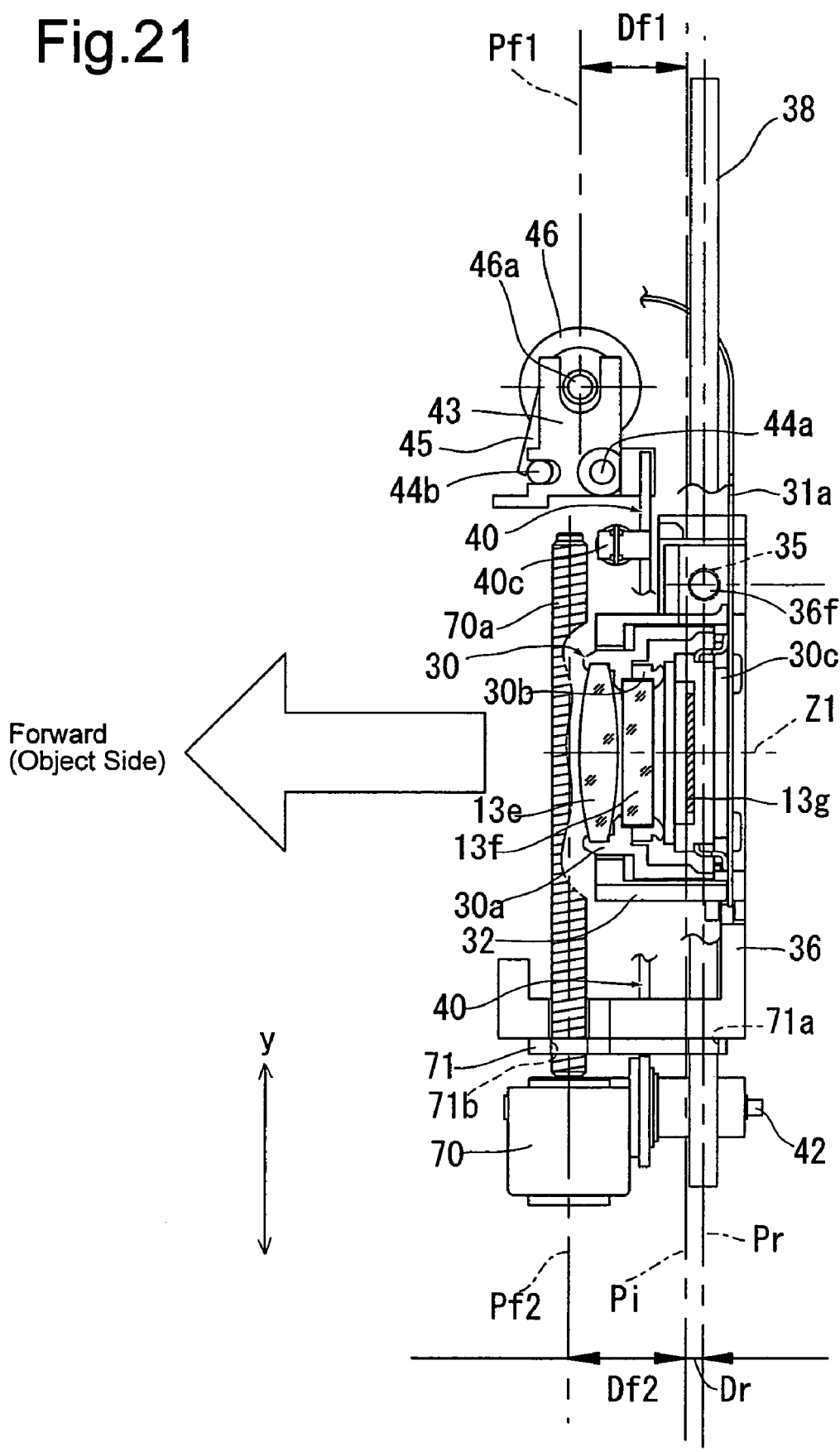
FIG. 21 is a side elevational view, which is sectioned in part, showing the positional relationship between the CCD holder and the driving devices thereof, with respect to the photographing optical axis direction.

FIG. 21 shows the front/rear positional relationship, in the direction of the photographing optical axis Z1, of the components constituting the image stabilizing mechanism. As shown in FIG. 21, the first stepping motor 46 which constitutes a driving source for driving the CCD holder 30 in the x-axis direction, and the second stepping motor 70 which constitutes a driving source for driving the CCD holder 30 in the y-axis direction, are provided in front (i.e., on the object side) of a plane (image-stabilizing plane) (hereinafter referred to as the imaging plane) Pi which is coincident with (i.e., shares the same plane as that of) the imaging surface of the CCD 13g. More specifically, the axis Pf1 of the drive shaft 46a of the first stepping motor 46 and the axis Pf2 of the drive shaft 70a of the second stepping motor 70 extend in a direction parallel to the imaging plane Pi, and axes Pf1 and Pf2 of the respective drive shafts 46a and 70a are positioned at forward distances Df1 and Df2, respectively, in front of (on the object side) the imaging plane Pi in a forward direction of the photographing optical axis Z1. Furthermore, not only the first and second stepping motors 46 and 70, the first moving member 43 which constitutes a driving-force transmission mechanism that transfers the driving force of the stepping motor 46 to the horizontal moving frame 32, the horizontal driving lever 40, and the driven nut member 45 also are positioned in front (on the object side) of the imaging plane Pi. A major portion of the driven nut member 71, which transfers the driving force of the second stepping motor 70 to the vertical moving frame (imaging-sensor supporting member) 36, also is provided in front of the imaging plane Pi in the forward direction of the photographing optical axis Z1, except for the end portion thereof which includes the rotation restricting groove 71a.

On the other hand, as shown in FIG. 21, each of the horizontal guide shaft 35, which guides the horizontal moving frame 32 in the x-axis direction, and the vertical guide shaft 38, which guides the vertical moving frame 36 in the y-axis direction, is provided behind the imaging plane Pi (behind the imaging surface) in a rearward direction of the photographing optical axis Z1. More specifically, the both axes of the horizontal guide shaft 35 and the vertical guide shaft 38 extend in a direction parallel to the imaging plane Pi, and both axes of the horizontal guide shaft 35 and the vertical guide shaft 38 are positioned on a plane Pr which is located at a rearward distance Dr behind the imaging plane Pi in the direction of the photographing optical axis Z1. In the illustrated embodiment, the amount of "shift" from which the axes of the horizontal guide shaft 35 and the vertical guide shaft 38 are positioned from the imaging plane Pi is the same. The axis of the horizontal guide shaft 35 extends through the plane Pr, although the horizontal guide shaft 35 is positioned behind a spring hooking portion 36f in FIG. 21, and hence is not shown. Note that, as mentioned above, the major portion of the driven nut member 71, including the female screw hole 71b, is provided in front of the imaging plane Pi in the direction of the photographing optical axis Z1; however, due to the engagement relationship between the rotation restricting groove 71a and the vertical guide shaft 38, the end portion which includes the rotation restricting groove 71a extends rearwards past the imaging plane Pi in the optical axis direction.

In the above-described image stabilizing mechanism which drives the CCD holder 30 (the third lens group 13e, the low-pass filter 13f and the CCD 13g) along a plane extending substantially orthogonal to the photographing optical axis Z1 in order to perform the camera shake counteracting operation (image stabilizing operation) and the radially retracting operation, driving devices such as the first and second stepping motors 46 and 70 are provided in a forward area (on the object side) with respect to the imaging plane Pi, and guide mechanisms such as the horizontal guide shaft 35 and the vertical guide shaft 38 are provided in a rearward area with respect to the imaging plane Pi. According to such an arrangement, the CCD holder 30 can be driven in a highly precise manner during a camera shake counteracting operation; the reason for which will be discussed hereinafter.

Generally, in a guiding device which guides a movable member, a minimal clearance is necessary in order to move such a movable member in a smooth manner. Furthermore, in a driving device such as a motor, backlash unavoidably occurs during the transfer of the driving force thereof. Namely, in the illustrated embodiment, clearance exists between the horizontal guide shaft 35 and the horizontal moving frame 32, clearance exists between the vertical guide shaft 38 and the vertical moving frame 36 (the vertical through-holes 36y1 and 36y2), and backlash also exists in the drive-transmission path from the first stepping motor 46 through to the horizontal moving frame 32 (via the horizontal driving lever 40, the first moving member 43, and the driven nut member 45) and in the drive-transmission path from the second stepping motor 70 through to the vertical moving frame 36 (via the driven nut member 71). Such clearance and backlash are determined at the design stage so as not to have adverse influence on the driving precision thereof in practice. However, in view of possible manufacturing error which may occur in the various components, it is desirable to construct an image-stabilizing mechanism in which such clearance and backlash has a minimal adverse influence on the driving precision thereof. Namely, in the illustrated embodiment, movable members, which are driven during an image-stabilizing operation, are included in the CCD holder 13g, and since tilting and positional shift of the imaging surface of the CCD 13g have a large influence on the picture quality, it is necessary to effectively prevent tilting and positional shift of the imaging surface from occurring. Furthermore, the first and second stepping motors 46 and 70 are used as the driving source of the image-stabilizing mechanism. As commonly known in the art, a stepping motor is rotated about a rotational axis in a stepwise manner in accordance with input pulses, and since there is a chance that the backlash which exists in the driving-force transmission mechanism which converts such rotational motion into linear motion may induce a time lapse (retardation) in control during high-speed reciprocating motion in an image-stabilizing operation, it is necessary to increase the precision of the image-stabilizing mechanism and to increase the capability of tracking the motion of the CCD holder 30 during the driving of the stepping motor.

However, in a driving device for driving a movable member, the farther the movable member is moved, the easier it is for the region where inaccuracies (such as clearance and backlash) occur to have a greater influence on the driving precision of the movable member. For example, in the case of a guide shaft and a slidable member, if the slidable member were to have a tilt error about one point on the guide shaft, even for the same amount of tilt, a slidable member which is provided at a radial position that is farther away from the center of tilt has greater amount of positional error due to such tilt than in the case of a slidable member which is provided at a radial position that is closer to the center of tilt. Furthermore, if the distance from the movable member to the guide device and/or driving device is large, any intermediate members provided therebetween have to be formed longer, which increases the chance of having adverse influence on the driving precision thereof due flexing of such intermediate members and manufacturing error. Furthermore, the longer such intermediate members are, the greater the space that is required, resulting in undesirable enlargement of the apparatus (i.e., the zoom lens 10). Due to such reasons, it is desirable to provide the guide device and driving device of the movable member as close to the movable member as possible. In the illustrated embodiment, the first and second stepping motors 46 and 70, which constitute driving devices, are provided on one side of (in front of) the imaging plane Pi, whereas the horizontal guide shaft 35 and the vertical guide shaft 38, which constitute guiding devices, are provided on the other side of (behind) the imaging plane Pi. Accordingly, it is easy to provide the driving devices and guiding devices close to the imaging surface of the CCD 13g, the CCD 13g being the subject (movable member) which is being moved in an image-stabilizing operation.

Figure 22:
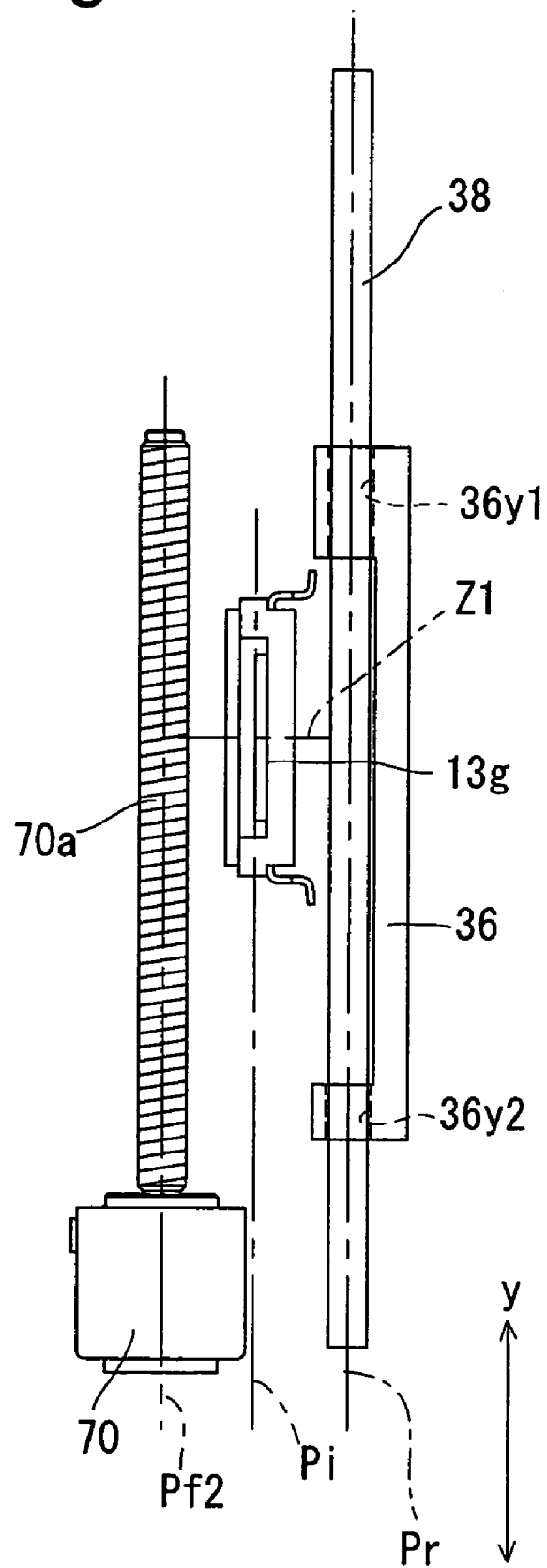
FIG. 22 is a side elevational view showing the forward/rearward positional relationship between the y-axis-direction driving mechanism (including the second stepping motor and the vertical guide shaft) and the CCD.
Figure 24:
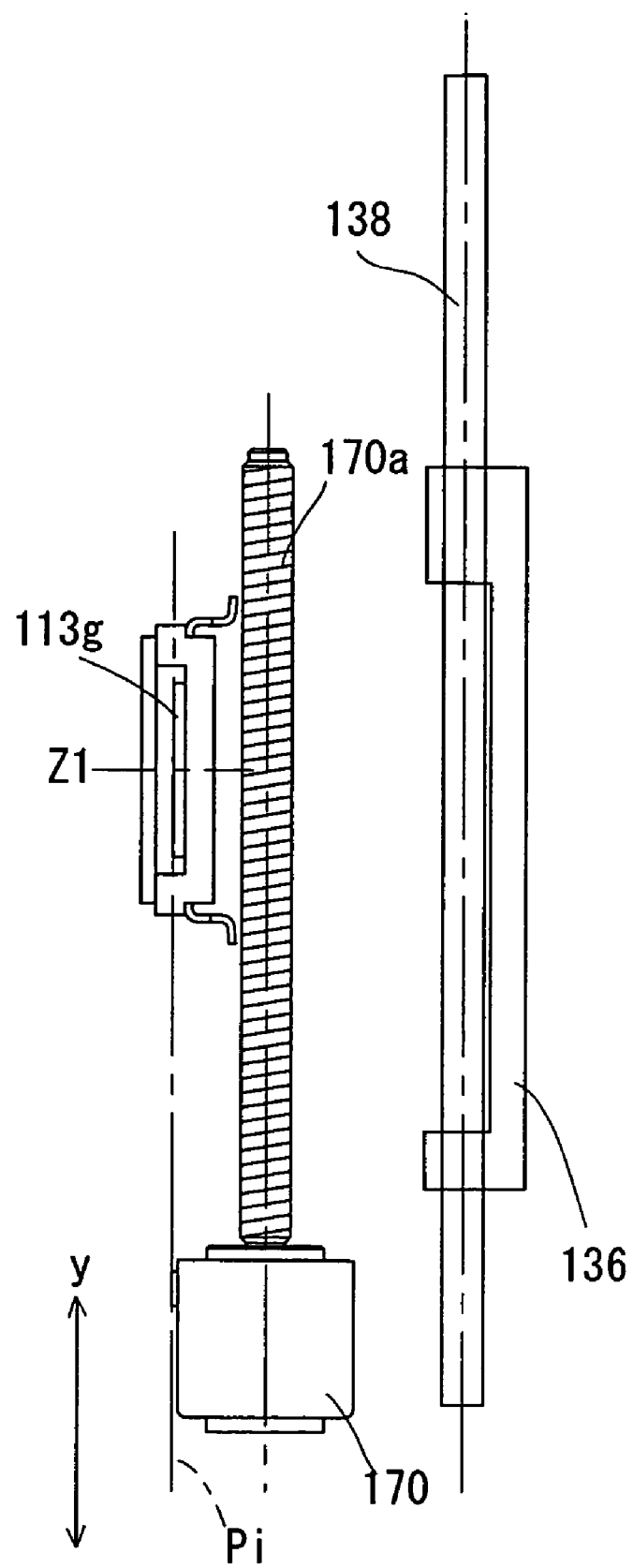
FIG. 24 is a side elevational view of comparative embodiment showing a forward/rearward positional relationship of the CCD, the second stepping motor, and the vertical guide shaft.
Figure 25:
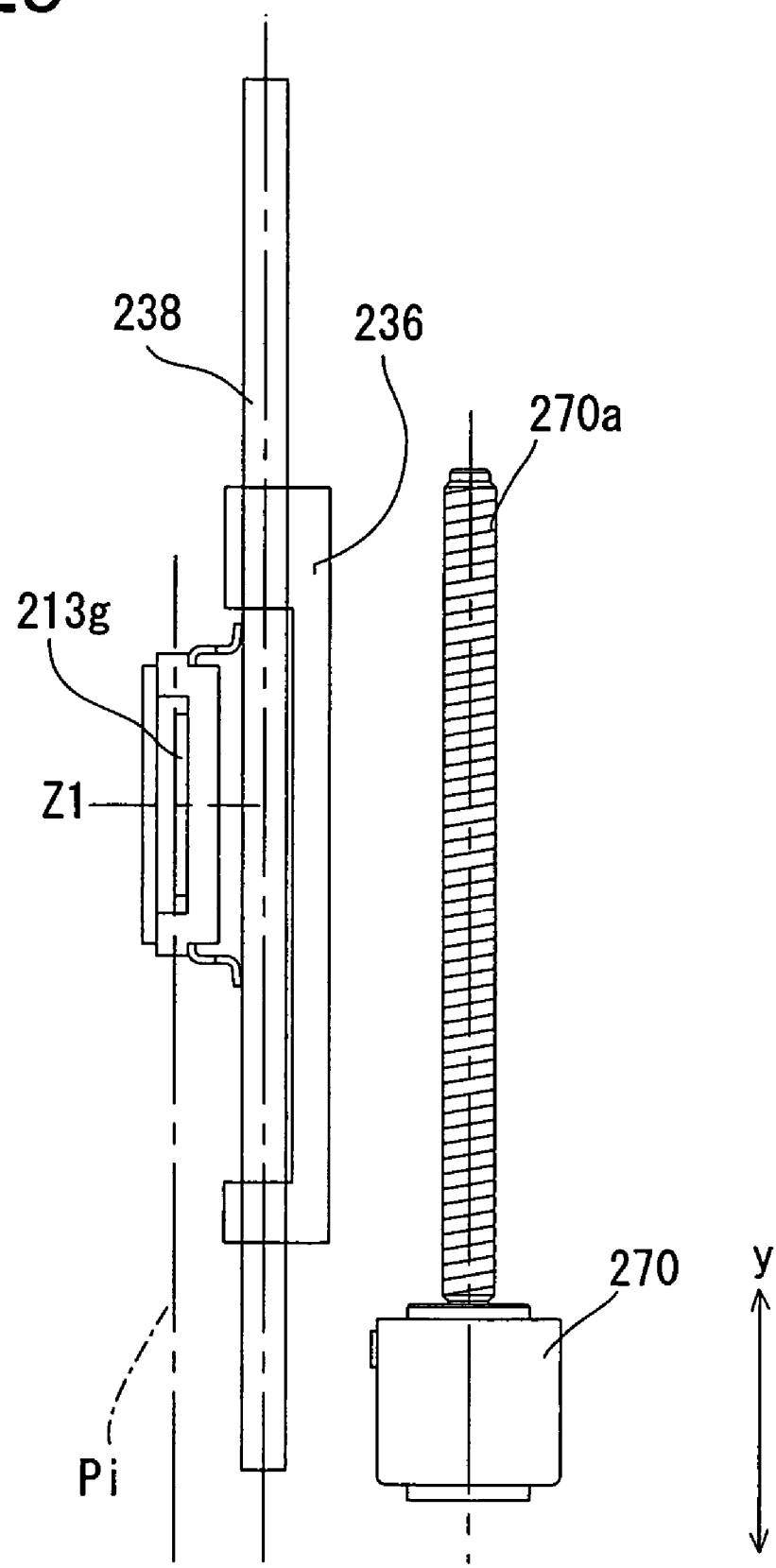
FIG. 25 is a side elevational view of another comparative embodiment showing a forward/rearward positional relationship of the CCD, the second stepping motor, and the vertical guide shaft.
Figure 26:
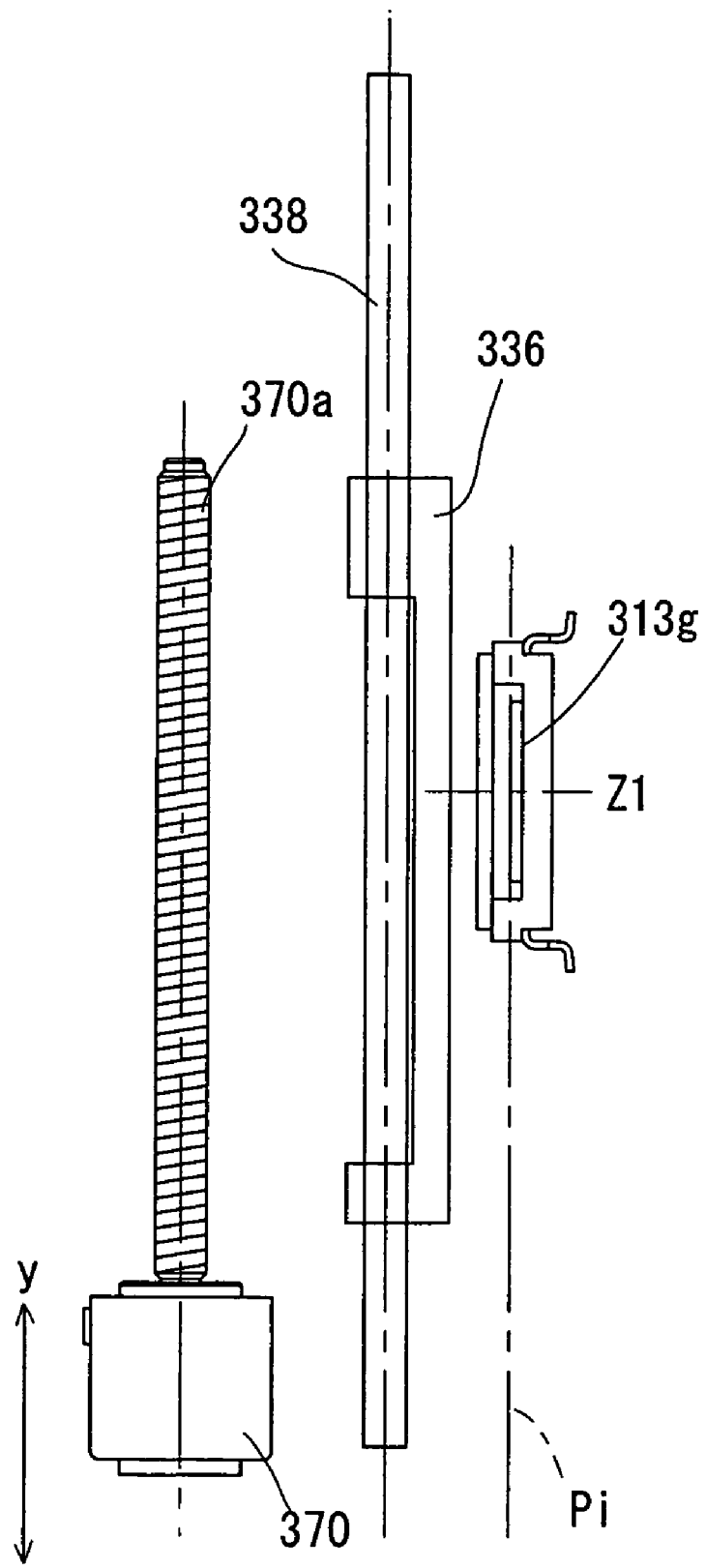
FIG. 26 is a side elevational view of another comparative embodiment showing a forward/rearward positional relationship of the CCD, the second stepping motor, and the vertical guide shaft.

A more specific description will herein be given with reference to FIG. 22, which corresponds to the present invention, and with reference to comparative examples shown in FIGS. 24 through 26. FIG. 22 shows the main components of the y-axis direction portion of the image-stabilization mechanism (y-axis-direction image-stabilizing mechanism) for the CCD 13g, according to the present invention. In FIG. 22, the driven nut member 71 is omitted for clarity, and only the second stepping motor 70 and the vertical guide shaft 38 which is a guiding device for guiding the movable member (CCD 13g) in the y-axis direction are shown. As shown in FIG. 22, by distributing the positions of the second stepping motor 70 (on the axis Pf2) and the vertical guide shaft 38 (on the plane Pr) at front and rearward locations, respectively, with respect to the imaging plane Pi, the second stepping motor 70 and the vertical guide shaft 38 can be respectively provided close to the imaging plane Pi without interfering with each other.

In the comparative examples shown in FIGS. 24 and 25, second stepping motors 170 and 270 (and drive shafts 170a and 270a) and vertical guide shafts 138 and 238, are respectively provided on the rearward side of the imaging plane Pi of respective CCDs 113g and 213g.

In the construction shown in FIG. 24, since the vertical guide shaft 138 is provided on the other side (rearward side) of the second stepping motor 170 from that of the CCD 113g (which is provided in front of the second stepping motor 170 (object side)) the vertical guide shaft 138 cannot be positioned close to the imaging plane Pi. Hence, precision error in the sliding portion between the vertical guide shaft 138 and a vertical moving frame (imaging-sensor supporting member) 136 has a large adverse influence on the moving precision of the CCD 113g. In other words, since the allowable clearance of the sliding portion between the vertical guide shaft 138 and the vertical moving frame 136 is small, the required precision of the moving parts (i.e., the vertical guide shaft 138 and the vertical moving frame 136) becomes strict, which can easily incur high manufacturing costs.

In the structure shown in FIG. 25, since the second stepping motor 270 (drive shaft 270a) is provided on the other side (rearward side) of the vertical guide shaft 238 from that of the CCD 213g (which is provided in front of the vertical guide shaft 238 (object side)), the second stepping motor 270 cannot be positioned close to the imaging plane Pi. Hence, backlash which exists within the driving-force transmission for transferring the rotational driving force of the drive shaft 270a to the CCD 213g can easily have a large adverse influence on the driving precision of the CCD 213g. In other words, similar to the structure shown in FIG. 24, the required precision of the moving parts (i.e., the vertical guide shaft 238 and a vertical moving frame (imaging-sensor supporting member) 236) becomes strict, which can easily incur high manufacturing costs.

In another comparative example shown in FIG. 26, a second stepping motor 370 (drive shaft 370a) and a vertical guide shaft 338 are both provided in front of the imaging plane Pi of a CCD 313g. In the structure shown in FIG. 26, since the second stepping motor 370 (drive shaft 370a) is provided on the other side of (in front of) the vertical guide shaft 338, the second stepping motor 370 cannot be positioned close to the imaging plane Pi. Hence, similar to the structure shown in FIG. 25, backlash which exists within the mechanism for transferring the rotational driving force of the drive shaft 370a to the CCD 313g can easily have a large adverse influence on the driving precision of the CCD 313g. Moreover, in the structure of FIG. 26, even if the positions of the second stepping motor 370 and the vertical guide shaft 338 were to be switched, the same problems as in the structure of FIG. 24 would occur in the vicinity of the vertical guide shaft 338 (i.e., occurrence of precision error in the sliding portion between the vertical guide shaft 338 and a vertical moving frame (imaging-sensor supporting member) 336).

In other words, as can be understood from the comparative examples shown in FIGS. 24 through 26, in a construction wherein a driving device (second stepping motor 170, 270 or 370) and a guiding device (vertical guide shaft 138, 238 or 338) are both provided in an area in front of the imaging plane Pi or are both provided in an area behind the imaging plane Pi, either the driving device or the guiding device will end up being located far away from the imaging surface of the CCD (113g, 213g or 313g), and accordingly, it would be difficult to achieve high-precision image-stabilization at a low cost. Conversely, according to the construction of the present invention shown in FIG. 22, the positions of the second stepping motor 70 and the vertical guide shaft 38 are distributed on front and rearward sides of the imaging plane Pi (i.e., are never provided on the same side of the imaging plane Pi), and accordingly, the driving device and the guiding device have a minimal adverse influence on the positional precision of the imaging surface of the CCD 13g, and image-stabilization can be performed with high precision at a low cost.

Figure 23:
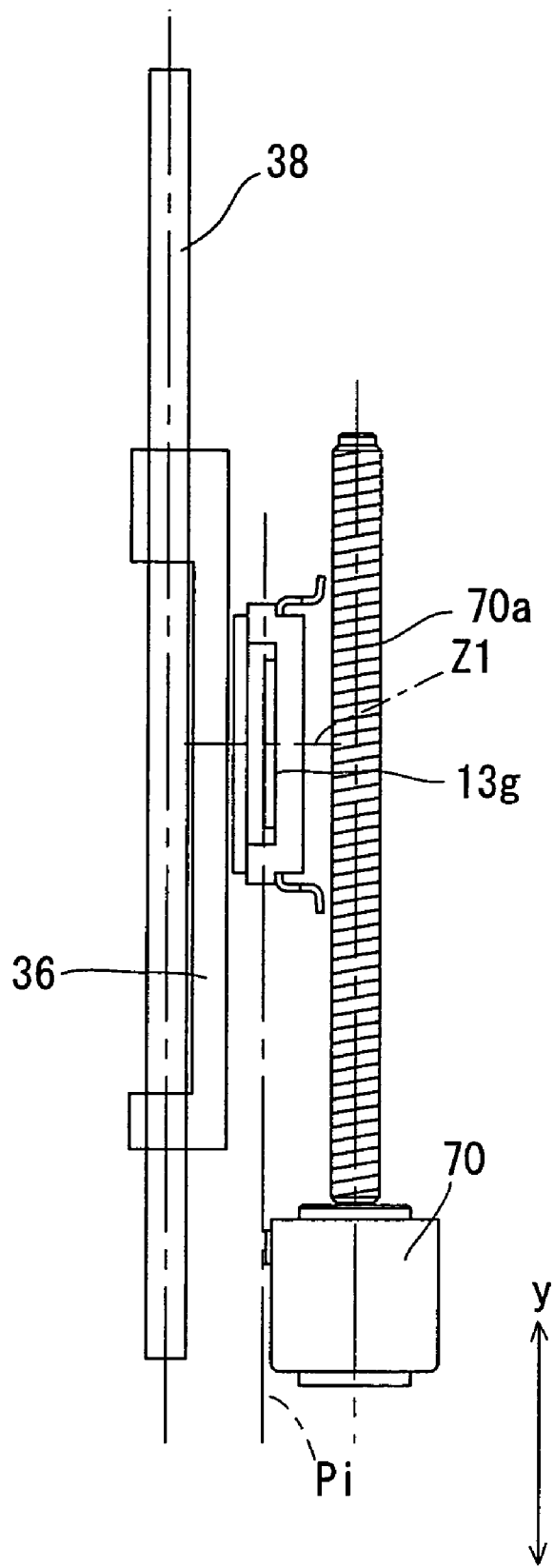
FIG. 23 is a side elevational view of a modified embodiment having a forward/rearward positional relationship between the second stepping motor and the vertical guide shaft, that is opposite to that shown in FIG. 22.

In order to drive the CCD 13g at a high precision, the front and rearward positions (with respect to the imaging plane Pi) of the axis of the vertical guide shaft 38 and the axis of the second stepping motor 70 can be reversed as shown in FIG. 23. However, with respect to the space efficiency within the zoom lens 10 of the present invention, the structure shown in FIG. 22 is more desirable than that of FIG. 23. The reason why the structure shown in FIG. 22 is more desirable is because, as shown in FIG. 2, rotational members such as the helicoid ring 18 and the cam ring 26 are provided in front of (on the object side) the CCD holder 30, and it is necessary to avoid interference between such front rotational members and the image-stabilizing mechanism. Furthermore, since the back surface (wall) of the camera is close to the rearward side of the CCD holder 30, it is difficult to achieve a large-enough space in the direction of the thickness of the camera (i.e., in the left/right direction of FIGS. 1 and 2 (in the direction of the photographing optical axis Z1)). If the vertical guide shaft 38 and the second stepping motor 70 are compared, as can be understood from FIG. 22, the vertical guide shaft 38 is long in the y-axis direction, however, the diameter thereof is small (the width thereof in the left/right direction in FIG. 22 is small). Conversely, the drive shaft 70a of the second stepping motor 70 is short in the y-axis direction, but the motor body of the second stepping motor 70 has a relatively large diameter (the width thereof in the left/right direction in FIG. 22 is relatively large). Accordingly, it is more desirable to provide the second stepping motor 70, having a short overall length in the y-axis direction, in the area in front of the imaging plane Pi wherein rotational members such as the helicoid ring 18 and the cam ring 26 are provided, rather than the vertical guide shaft 38, because it is easier to avoid interference between the second stepping motor 70 and the rotational members such as the helicoid ring 18 and the cam ring 26. Furthermore, it is more desirable to provide the vertical guide shaft 38, which has a smaller diameter than that of the second stepping motor 70, in the area on the rearward side of the imaging plane Pi which is narrow in width in the thickness direction of the camera (in the direction of the photographing optical axis Z1). In other words, providing the vertical guide shaft 38 behind the imaging plane Pi enables the camera to be constructed thinner (in the direction of the photographing optical axis Z1). In the area behind the CCD 13g, since there is a space into which neither the helicoid ring 18 nor the cam ring 26 enter (see FIG. 1), even if the vertical guide shaft 38 is long in the y-axis direction, the vertical guide shaft 38 can be easily provided behind the CCD 13g without interfering with the helicoid ring 18 or cam ring 26.

Note that although in FIG. 22 the distances of the axis Pf2 and the plane Pr from the imaging plane Pi in the forward and rearward directions, respectively, are shown as substantially the same distance, in practice, as shown in FIG. 21, the rearward distance Dr from the imaging plane Pi to the axes of the horizontal guide shaft 35 and the vertical guide shaft 38, and the forward distances Df1 and Df2 from the imaging plane Pi to the axes of the drive shafts 46a and 70a of the first and second stepping motors 46 and 70, respectively, have the following relationship:

Df1>Dr, and
Df2>Dr.

In other words, in the forward/rearward direction of the CCD 13g (i.e., in the direction of the photographing optical axis Z1), the horizontal guide shaft 35 and the vertical guide shaft 38 are positioned closer to the imaging plane Pi than the first and second stepping motors 46 and 70. As mentioned above, since the space behind the CCD 13*g* is particularly restricted, with respect to reducing the thickness of the camera in the direction of the photographing optical axis Z1, it is desirable for the horizontal guide shaft 35 and the vertical guide shaft 38 to be positioned as close to the imaging plane Pi as possible, as shown in FIG. 21.

Although the above description has been directed to the characteristics of the vertical guide shaft 38 and the second stepping motor 70, which constitute the y-axis-direction image-stabilizing mechanism, the horizontal guide 35 and the first stepping motor 46, which constitute an x-axis-direction image-stabilizing mechanism, are also positioned in accordance with the same technical principle as that of the vertical guide shaft 38 and the second stepping motor 70. Namely, the first stepping motor 46 and the horizontal guide shaft 35 are distributed (positioned) on front and rearward sides of the imaging plane Pi of the CCD 13*g*, respectively (see FIG. 21), so that it is likewise possible to provide both the first stepping motor 46 and the horizontal guide shaft 35 close to the CCD 13*g*, respectively, in the direction of the photographing optical axis Z1. Accordingly, the manufacturing cost of the image-stabilizing mechanism can be reduced, and the CCD holder 30 which includes the CCD 13*g* can be driven in the x-axis direction with high precision.

Note that similar to the modified embodiment of the y-axis-direction image-stabilizing mechanism shown in FIG. 23, the x-axis-direction image-stabilizing mechanism can alternatively be constructed to provide the horizontal guide shaft 35 in front of the imaging plane Pi, and to provide the first stepping motor 46 behind the imaging plane Pi. However, in the x-axis-direction image-stabilizing mechanism, as can be understood from FIGS. 13 and 14, since a portion of the horizontal guide shaft 35 is positioned within the inner circumference of the helicoid ring 18, as viewed from the front of the zoom lens 10, it is desirable to provide the first stepping motor 46 in an area in front of the imaging plane Pi and provide the horizontal guide shaft 35 in an area behind the imaging plane Pi in order to avoid interference between the horizontal guide shaft 35 and the helicoid ring 18. Since the first stepping motor 46 has a shorter overall length in the x-axis direction than that of the horizontal guide shaft 35, the first stepping motor 46 can be space-efficiently accommodated in an area in front of the imaging plane Pi without interfering with the helicoid ring 18 (see FIGS. 13 and 14).

Although the present invention has been described with respect to the illustrated embodiments, the present invention is not limited thereto. Although in the illustrated embodiments the optical axis of the zoom lens 10 is the photographing optical axis Z1 which has no bends therein, the present invention can be applied to an optical system wherein the photographing optical axis thereof is bent at one or more optical axis positions. Furthermore, although in the illustrated embodiments, the third lens group 13*e*, the low-pass filter 13*f* and the CCD 13*g* are moved as an integral unit during an image-stabilizing operation, the present invention can be applied to an embodiment wherein only the CCD (and the cover glass thereof) is moved during an image-stabilizing operation.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging device, comprising:
an imaging sensor having an imaging surface upon which an object image is formed via a photographing optical system;
a guiding device for guiding said imaging sensor in a direction parallel to said imaging surface of said imaging sensor; and
a driving device for driving said imaging sensor, while being guided by said guiding device, based on an output of an image-shake detector which detects a direction and magnitude of an amount of vibration applied to said photographing optical system,
wherein at least part of one and at least part of the other of said guiding device and said driving device are respectively provided in front of and behind an image-stabilizing plane, which is coincident with said imaging surface of said imaging sensor, with respect to an optical axis direction of said photographing optical system.

2. The imaging device according to claim 1,
wherein said driving device is provided in front of said image-stabilizing plane, and said guiding device is provided behind said image-stabilizing plane, with respect to said optical axis direction.

3. The imaging device according to claim 1,
wherein said guiding device and said driving device comprise a first guiding device and a first driving device for linearly moving said imaging sensor along said image-stabilizing plane in a first direction, and a second guiding device and a second driving device for linearly moving said imaging sensor along said image-stabilizing plane in a second direction.

4. The imaging device according to claim 1,
wherein said guiding device is provided so as to extend in a direction parallel to said image-stabilizing plane, and
wherein said guiding device comprises a linear guide shaft which is slidably fitted through an imaging-sensor supporting member.

5. An imaging device, comprising:
an imaging sensor having an imaging surface upon which an object image is formed via a photographing optical system;
a guiding device for guiding said imaging sensor in a direction parallel to said imaging surface of said imaging sensor; and
a driving device for driving said imaging sensor, while being guided by said guiding device, based on an output of an image-shake detector which detects a direction and magnitude of an amount of vibration applied to said photographing optical system,
wherein at least part of one and at least part of the other of said guiding device and said driving device are respectively provided in front of and behind an image-stabilizing plane, which is coincident with said imaging surface of said imaging sensor, with respect to an optical axis direction of said photographing optical system,
wherein said guiding device is provided so as to extend in a direction parallel to said image-stabilizing plane,
wherein said guiding device comprises a linear guide shaft which is slidably fitted through an imaging-sensor supporting member, and
wherein said driving device comprises:
a motor having a rotational shaft which extends substantially parallel to said linear guide shaft; and
a driving-force transmission device which converts a rotational motion of said rotational shaft of said motor into linear motion which moves in a direction parallel to said linear guide shaft, so as to apply said linear motion to said imaging-sensor supporting member.

6. The imaging device according to claim 5,
wherein said motor comprises a stepping motor.

7. The imaging device according to claim 5,
wherein said driving-force transmission device comprises
a driven nut which is moved in the direction parallel to said linear guide shaft in accordance with rotation of said rotational shaft of said motor.

8. The imaging device according to claim 7, wherein said driving-force transmission device further comprises:
a linearly moving member which is moved in the direction parallel to said linear guide shaft via said driven nut; and
a swing member which is rotatable about a rotation axis parallel to said optical axis of said photographing optical system, said swing member pushing said imaging-sensor supporting member, which supports said image sensor, to move along the guiding direction of said linear guide shaft.

9. The imaging device according to claim 1,
wherein the entireties of one and the other of said guiding device and said driving device are respectively provided in front of and behind the image-stabilizing plane, which is coincident with said imaging surface of said imaging sensor, with respect to the optical axis direction of said photographing optical system.

10. The imaging device according to claim 1,
wherein one and the other of said guiding device and said driving device are respectively provided in front of and behind the imaging sensor and the image-stabilizing plane, which is coincident with said imaging surface of said imaging sensor, with respect to the optical axis direction of said photographing optical system.

11. The imaging device according to claim 1, the driving device including a motor having a driving shaft, the driving shaft being located on one side of the imaging surface, the guiding device including a guide shaft, the guide shaft being provided on the other side of the imaging surface.

12. The imaging device according to claim 5, the rotational shaft being positioned on one side of the imaging surface and the linear guide shaft being positioned on the other side of the imaging surface.

* * * * *